(12) United States Patent
Sudoh

(10) Patent No.: US 8,493,665 B2
(45) Date of Patent: Jul. 23, 2013

(54) ZOOM LENS, IMAGING APPARATUS, AND INFORMATION DEVICE

(75) Inventor: Yoshifumi Sudoh, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 120 days.

(21) Appl. No.: 13/050,552

(22) Filed: Mar. 17, 2011

(65) Prior Publication Data

US 2011/0228408 A1    Sep. 22, 2011

(30) Foreign Application Priority Data

Mar. 18, 2010 (JP) .................................. 2010-063386

(51) Int. Cl.
*G02B 15/14*    (2006.01)

(52) U.S. Cl.
USPC .......................................... 359/687; 359/683

(58) Field of Classification Search
USPC .......................................................... 359/687
See application file for complete search history.

(56) References Cited

U.S. PATENT DOCUMENTS

| | | | |
|---|---|---|---|
| 4,632,519 A | 12/1986 | Takahashi | |
| 5,568,321 A | 10/1996 | Ogawa et al. | |
| 6,404,561 B1 | 6/2002 | Isono et al. | |
| 7,372,636 B2 | 5/2008 | Sudoh | |
| 7,535,653 B2 | 5/2009 | Sudoh | |
| 7,535,654 B2 | 5/2009 | Ohashi | |
| 7,623,298 B2 | 11/2009 | Sudoh | |
| 7,636,201 B2 | 12/2009 | Sudoh et al. | |
| 7,672,066 B2 * | 3/2010 | Ohashi | 359/774 |
| 7,719,773 B2 | 5/2010 | Atsuumi et al. | |
| 7,869,136 B2 * | 1/2011 | Nakagawa et al. | 359/686 |
| 7,933,074 B2 * | 4/2011 | Takano et al. | 359/687 |
| 8,149,517 B2 * | 4/2012 | Ohashi | 359/687 |
| 8,164,674 B2 * | 4/2012 | Imamura et al. | 348/335 |
| 2004/0161228 A1 | 8/2004 | Nanba | |

(Continued)

FOREIGN PATENT DOCUMENTS

| CN | 101256567 A | 9/2008 |
|---|---|---|
| JP | 8-248317 | 9/1996 |

(Continued)

OTHER PUBLICATIONS

U.S. Appl. No. 13/046,087, filed Mar. 11, 2011, Sudoh.

(Continued)

*Primary Examiner* — Jordan Schwartz
(74) *Attorney, Agent, or Firm* — Oblon, Spivak, McClelland, Maier & Neustadt, L.L.P.

(57) ABSTRACT

A zoom lens includes a first lens group having a positive refractive power, a second lens group having a negative refractive power, a third lens group having a positive refractive power, and a fourth lens group having a positive refractive power, which are disposed in order from an object side to an image side and an aperture stop disposed between the second and third lens groups. When changing the magnification of the zoom lens from a short focal end to a long focal end, an interval between the first and second lens groups increases, an interval between the second and third lens groups decreases, and an interval between the third and fourth lens groups increases. The first and third lens groups are moved so as to be positioned at object side positions at the long focal end relative to positions at the short focal end. The third lens group has two positive lenses. Predetermined conditions of the positive lenses of the third lens group are satisfied.

10 Claims, 22 Drawing Sheets

U.S. PATENT DOCUMENTS

| | | |
|---|---|---|
| 2008/0278779 A1 | 11/2008 | Nishina et al. |
| 2009/0147375 A1 | 6/2009 | Sudoh et al. |
| 2009/0195886 A1 | 8/2009 | Hankawa et al. |
| 2009/0323200 A1 | 12/2009 | Sudoh |
| 2010/0027136 A1 | 2/2010 | Ohashi et al. |
| 2010/0296180 A1 | 11/2010 | Sudoh et al. |
| 2011/0043927 A1 | 2/2011 | Sudoh |
| 2011/0051260 A1 | 3/2011 | Nakayama et al. |

FOREIGN PATENT DOCUMENTS

| | | |
|---|---|---|
| JP | 3391342 | 1/2003 |
| JP | 2004-333768 | 11/2004 |
| JP | 2008-26837 | 2/2008 |

OTHER PUBLICATIONS

G. F. Brewster, et al., "Partial Dispersion Ratios of Some New Borate and Phosphate Glasses", XP-002648911, vol. 5, No. 12, Dec. 1966, pp. 1891-1894.

Extended Search Report issued Jul. 22, 2011 in European Patent Application No. 11158902.4-1524.

Combined Chinese Office Action and Search Report issued Nov. 16, 2012 in Chinese Patent Application No. 201110070495.1 (with English-language translation).

* cited by examiner

FIG. 1
(a) SHORT FOCAL END (Wide)
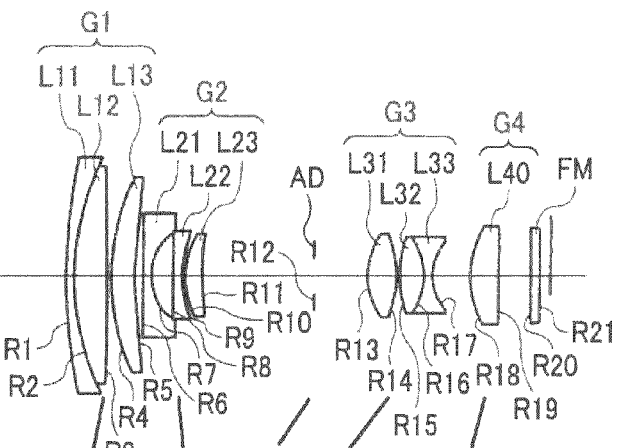
(b) SHORT-INTERMEDIATE (W-M)
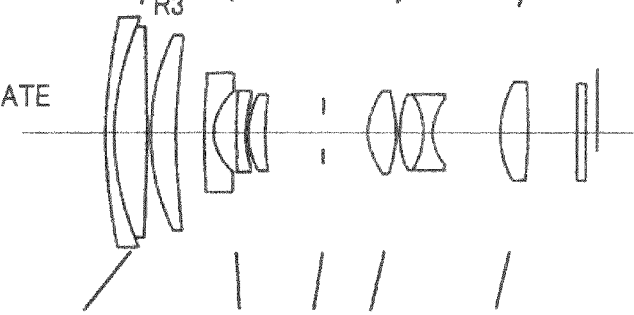
(c) INTERMEDIATE FOCAL POSITION (Mean)
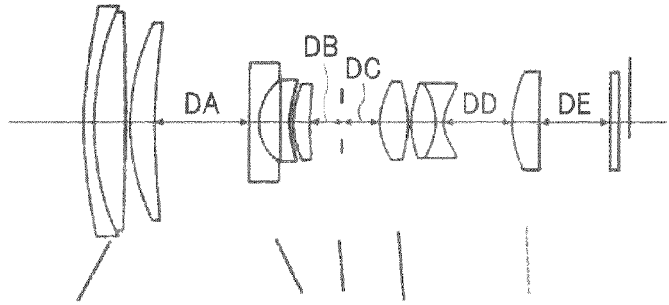
(d) INTERMEDIATE-LONG (M-T)
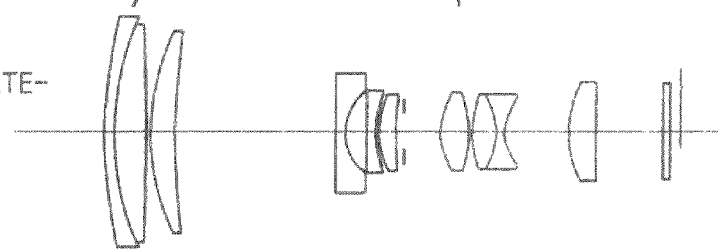
(e) LONG FOCAL END (Tele)
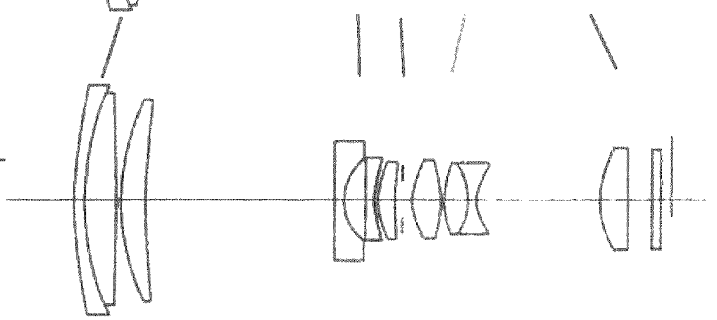

FIG. 7
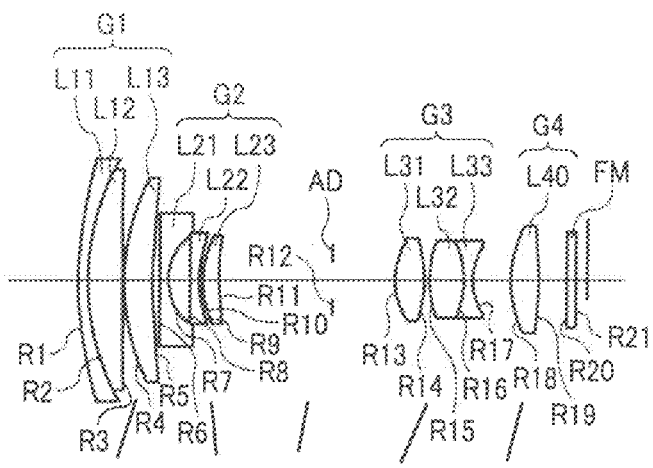
(a) SHORT FOCAL END (Wide)
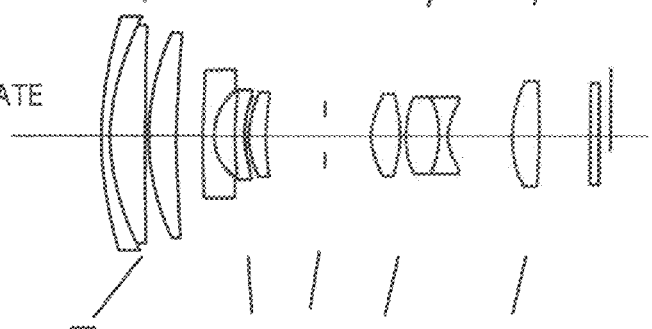
(b) SHORT-INTERMEDIATE (W-M)
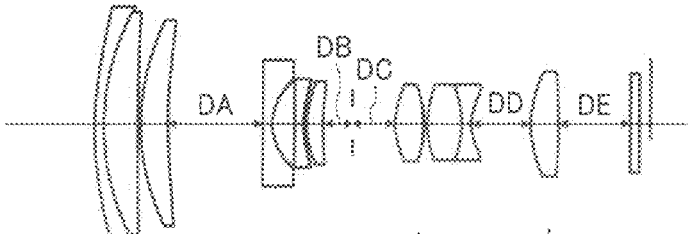
(c) INTERMEDIATE FOCAL POSITION (Mean)
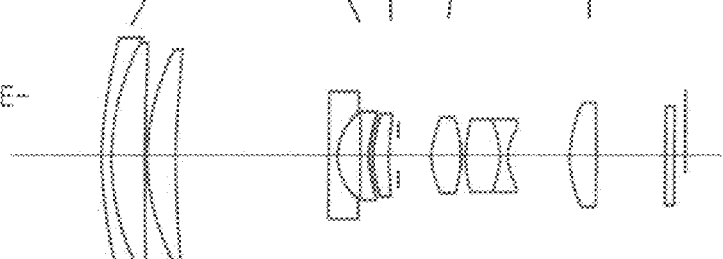
(d) INTERMEDIATE-LONG (M-T)
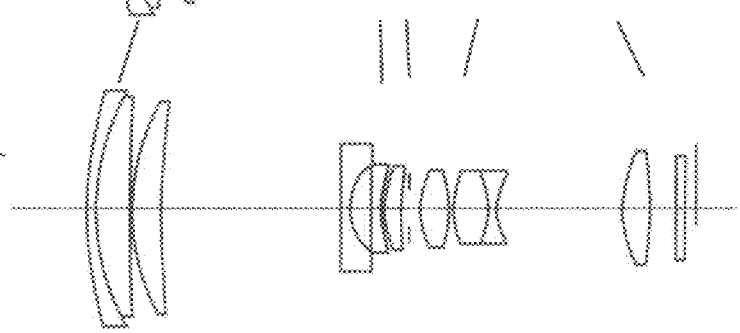
(e) LONG FOCAL END (Tele)

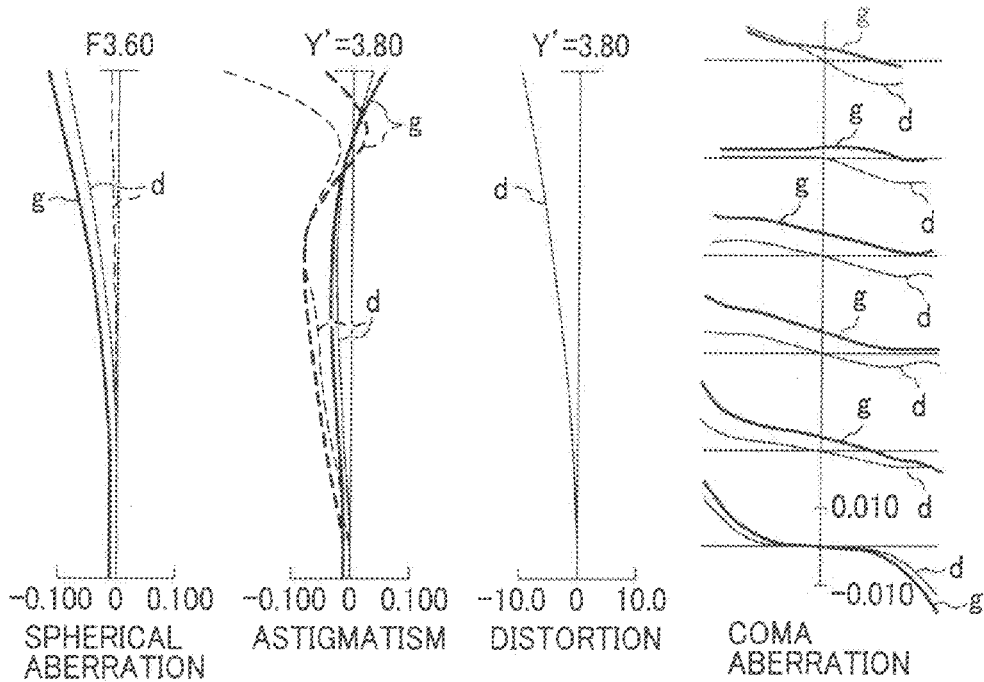
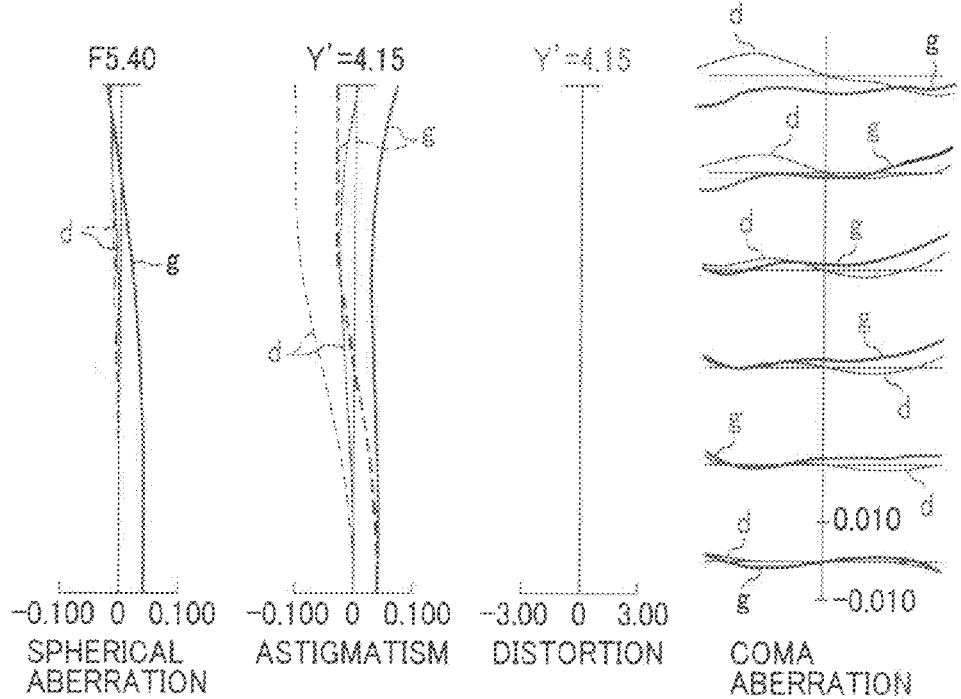

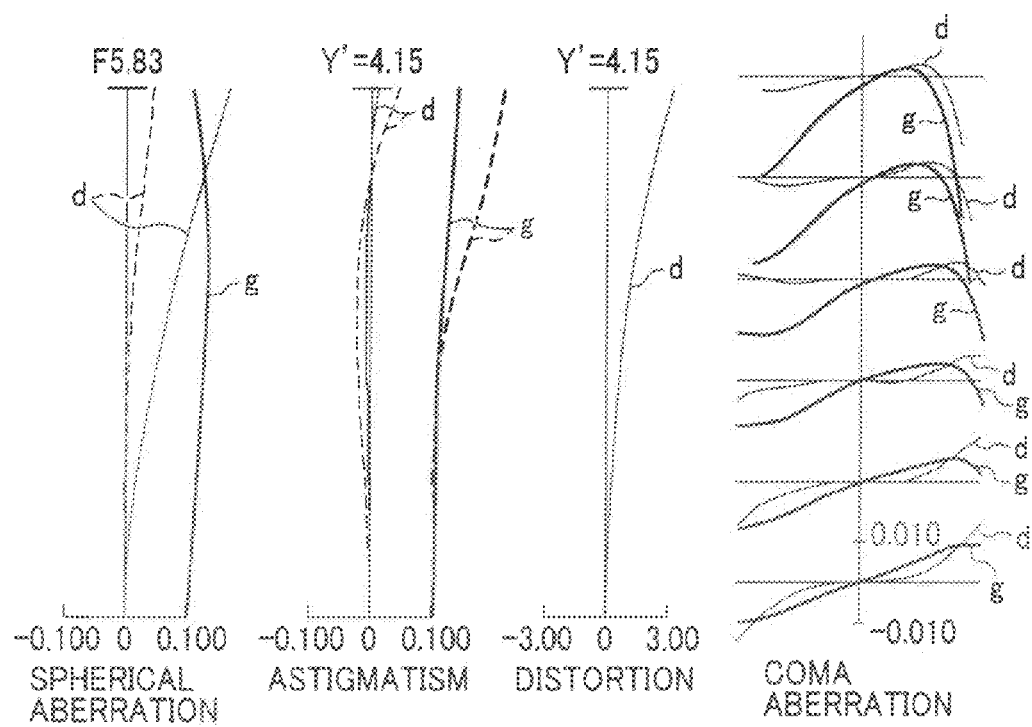

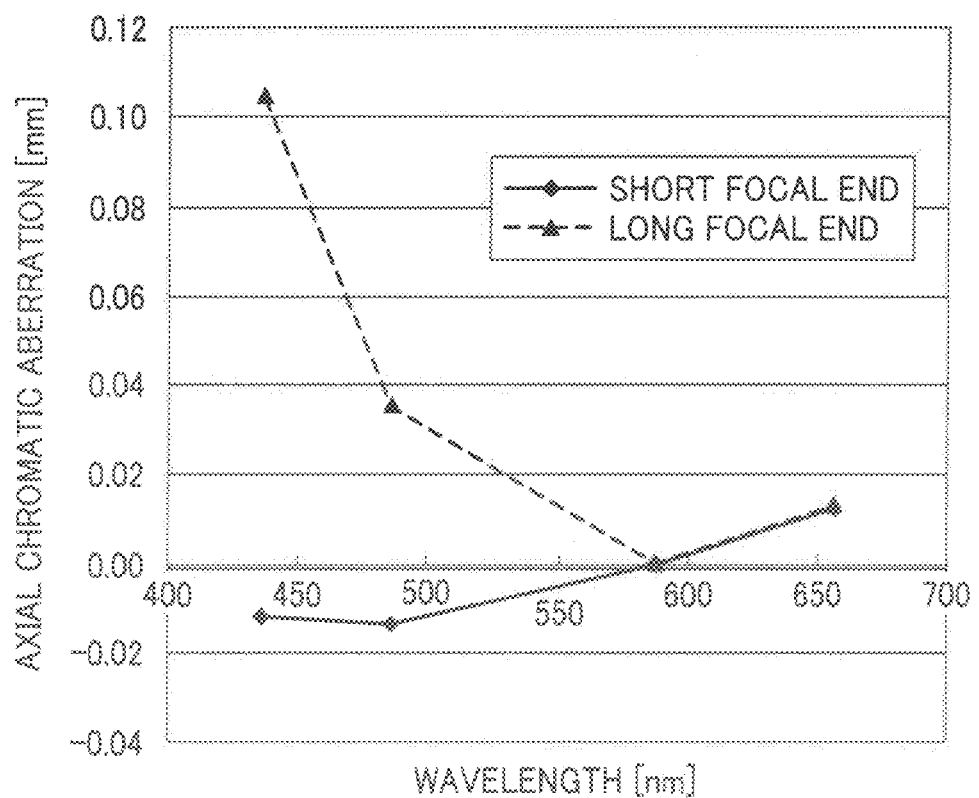

FIG. 13
(a) SHORT FOCAL END (Wide)
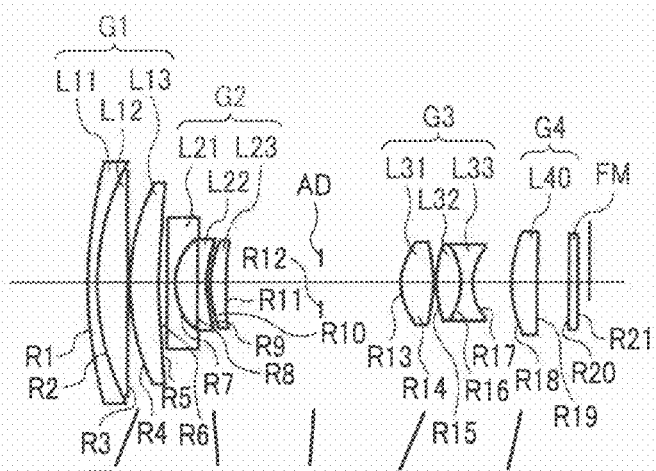
(b) SHORT-INTERMEDIATE (W-M)
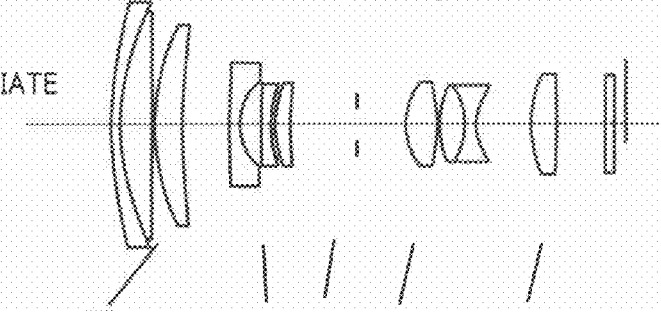
(c) INTERMEDIATE FOCAL POSITION (Mean)
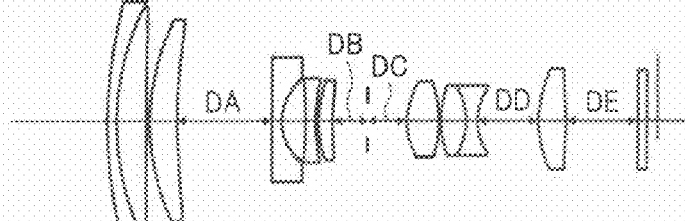
(d) INTERMEDIATE-LONG (M-T)
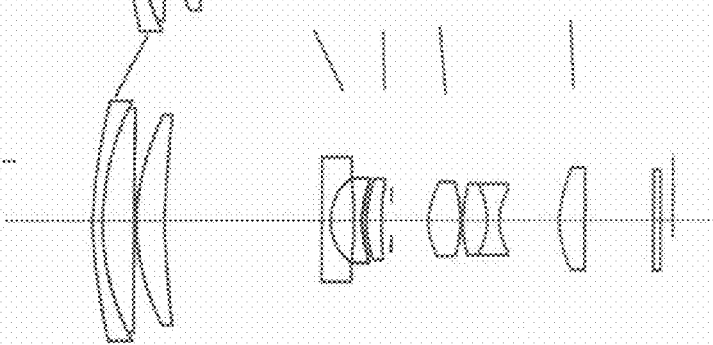
(e) LONG FOCAL END (Tele)
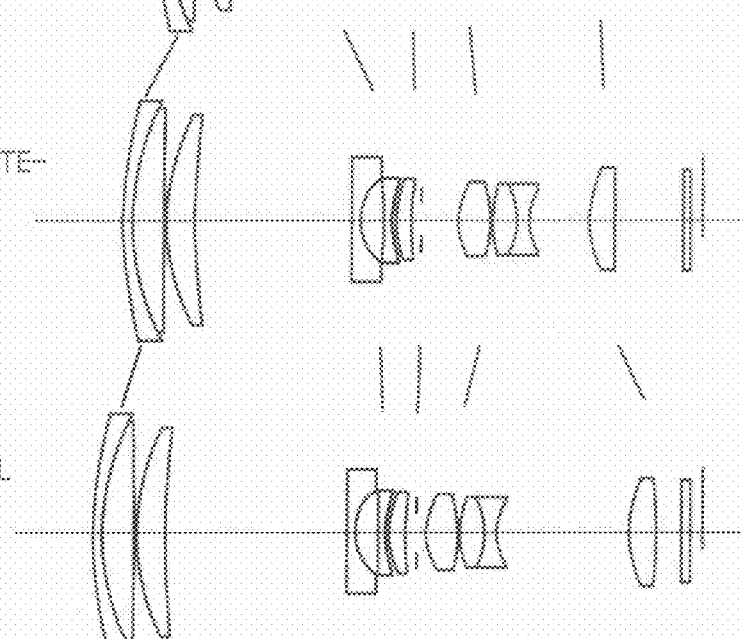

CHROMATIC ABERRATION OF MAGNIFICATION [0.7Y']

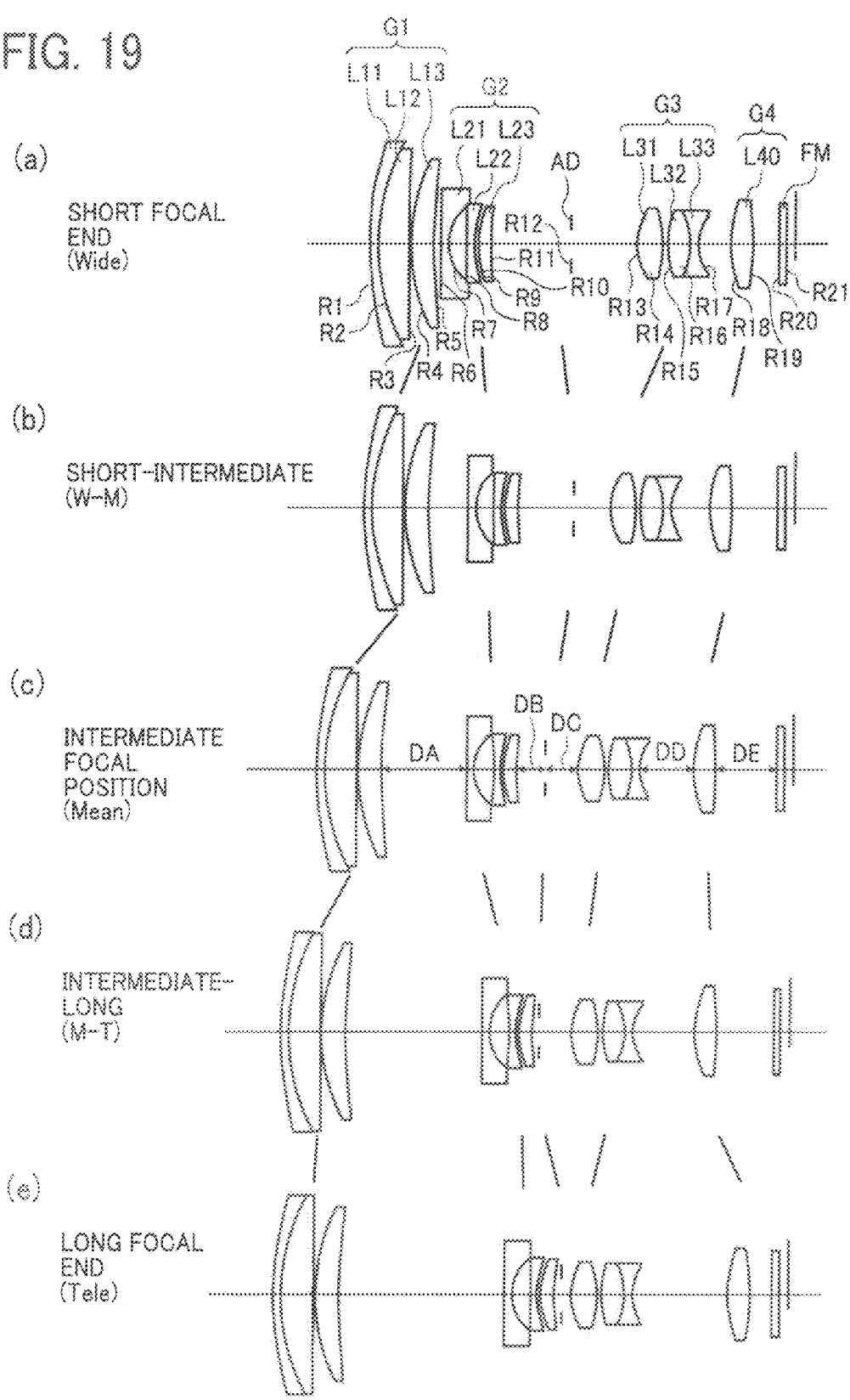

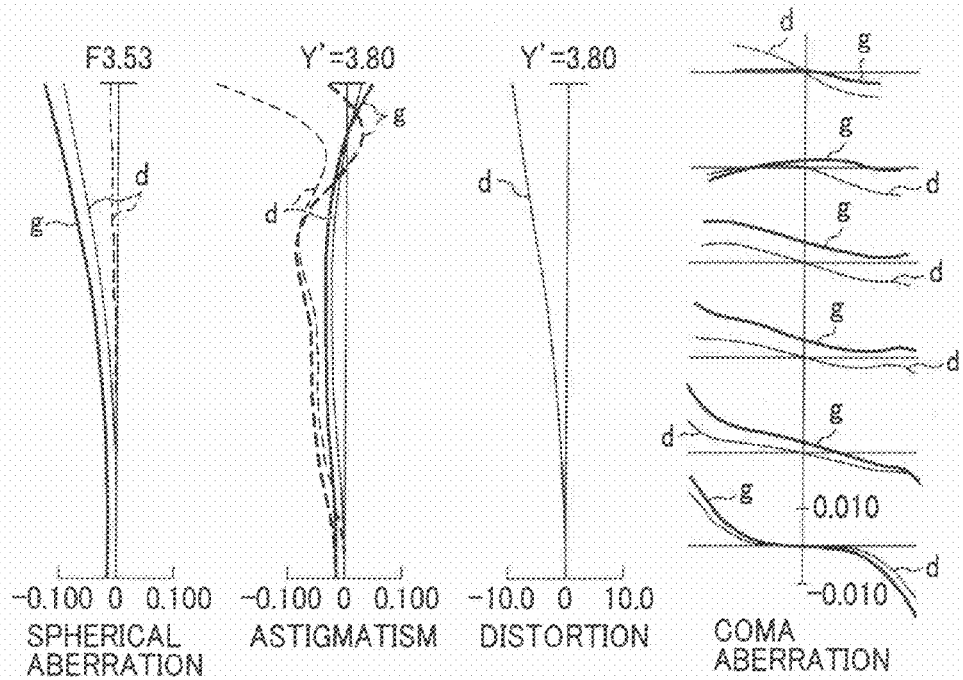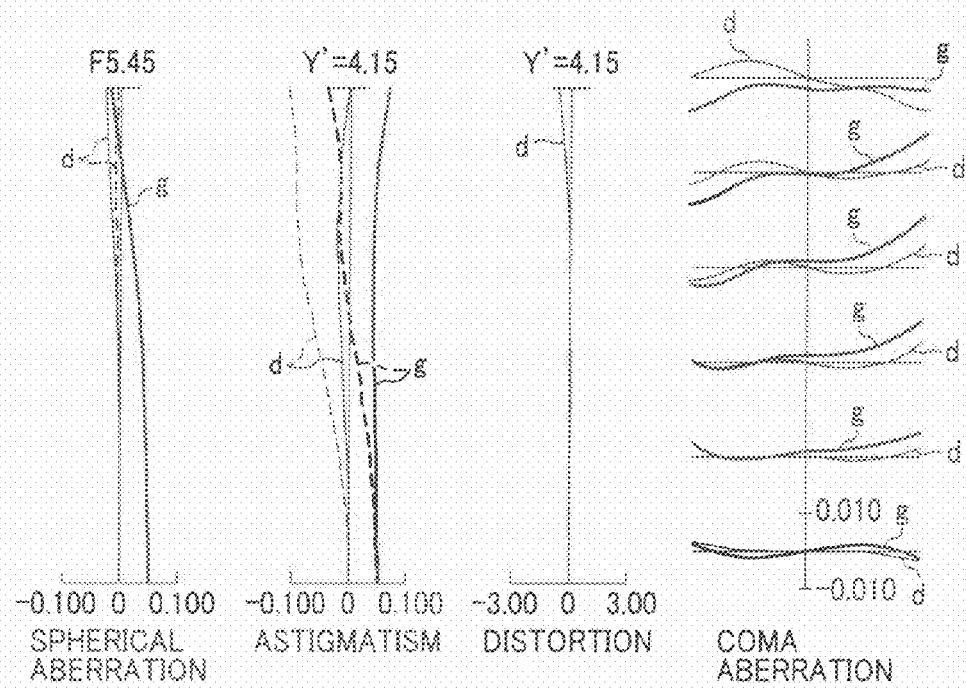

ZOOM LENS, IMAGING APPARATUS, AND INFORMATION DEVICE

The present application is based on and claims priority from Japanese Application Number 2010-063386, filed on Mar. 18, 2010, the disclosure of which is hereby incorporated by reference herein in its entirety.

BACKGROUND OF THE INVENTION

1. Field of the Invention

The present invention relates to a lens having a zooming function by changing focal length to change a field angle, particularly, a zoom lens preferable for a digital camera, a video camera, and the like acquiring digital image data of a subject by use of a solid-state image pickup device, an imaging apparatus having such a zoom lens as a photographic optical system, and an information device having such a photographic function.

2. Description of the Related Art

Recently, in widely used digital cameras, various types of requirement, especially high performance and small size have been further required and therefore a high-performance and small-size zoom lens which is installed therein as a photographing lens is also required.

In the zoom lens, in order to reduce the size, it is required to reduce an entire length (distance from a most object side lens surface to an imaging plane) in use, and it is important for reduction of size to reduce an entire length in a collapsed state by reducing a thickness of each lens group. As the high performance of the zoom lens, a resolution corresponding to an image pickup device having at least ten to fifteen million pixels is required for an entire zooming range.

Furthermore, a wider field angle of a photographing lens is required by many users and a half field angle of the zoom lens at a wide angle end is preferably 38 degrees or more. The half field angle of 38 degrees corresponds to a focal length of 28 mm in a case of a silver-salt camera using a silver-salt film (so-called Leica film) having a width of 35 mm.

Furthermore, high magnification ratio is also required. The zoom lens having a focal length corresponding to of 28 to 200 mm in a 35 mm silver salt camera conversion (about 7.1 times) enables all of the general photographing.

As the zoom lens for the digital camera, various types of the zoom lenses are used. As a well known zoom lens having high magnification ratio or large diameter, there is a zoom lens including four lens groups of a first lens group having a positive refractive power, a second lens group having a negative refractive power, a third lens group having a positive refractive power, and a fourth lens group having a positive refractive power, which are disposed in order from an object side. In such a zoom lens, when changing the magnification from the short focal end to the long focal end, an interval between the first lens group and the second lens group is increased, an interval between the second lens group and the third lens group is decreased, and an interval between the third lens group and the fourth lens group is changed.

As the zoom lens of this type, the first lens group is fixed or reciprocated and moved in an arc which is convex at an image side when changing the magnification. In this type, if a movement amount of the second lens group which largely shares a function of the magnification operation is attempted to be largely ensured, an aperture stop provided at a vicinity of the third lens group is far from the first lens group even when the zoom lens is at the short focal end. Accordingly, when the wide angle zoom lens is required, the first lens group is required to be large in order to achieve the high magnification ratio. Therefore, in order to achieve a wide angle, high magnification and small size zoom lens, the first lens group is preferably moved so as to be positioned at the long focal end to the position which is at the object side of the position at the short focal end.

The entire length of the zoom lens at the wide angle end is reduced so as to be less than the entire length of the zoom lens at the telephoto end so that the size of the first lens is prevented from increasing and a sufficient wide angle can be achieved.

On the other hand, in a correction of the chromatic aberration which readily occurs with increasing the magnification ratio and the focal length, it is effective to use the lens having an anomalous dispersion property, as well known.

As the zoom lens including a first lens group having a positive focal length, a second lens group having a negative focal length, a third lens group having a positive focal length, and a fourth lens group having a positive focal length, which are disposed in order from an object side, and in which an interval between the first lens group and the second lens group is increased, an interval between the second lens group and the third lens group is decreased, and an interval between the third lens group and the fourth lens group is changed when changing the magnification from the short focal end to the long focal end, the zoom lens using an anomalous dispersion property is disclosed in Japanese Patent Application Publication Nos. H08-248317, and 2008-026837 and Japanese Patent Nos. 3391342 and 4405747.

In these Documents, in the zoom lens disclosed in Japanese Patent Application Publication No. 1108-248317, the first lens group is fixed when changing the magnification and half field angle at the short focal end is 25 degrees and a wide angle is not sufficient.

The zoom lens disclosed in Japanese Patent No. 3391342 includes a four-lens group configuration having positive-negative-positive-positive lens groups (see Examples 1, 2 and 6) and the zoom lens has a field angle of about 29 to 32 degrees at the short focal end so that the wide angle is not sufficiently achieved.

The zoom lens disclosed in Japanese Patent No. 4405747 has a wide angle, that is, a half field angle of about 37 degrees at the wide angle end. However, the lens configuration includes many lenses, that is, 14 lenses and therefore it is difficult to achieve the reduced entire length in a collapsed state and low cost.

The zoom lens disclosed in Japanese Patent Application Publication No. 2008-026837 has a relatively small number of lenses, that is, 9 to 11 lenses so that wide angle and high magnification is achieved with a simple configuration. However, there is room for improvement in the small size because the entire length at the telephoto end is slightly large.

SUMMARY OF THE INVENTION

The present invention has been made in light of the circumstances described above, and an object of the present invention is to provide a zoom lens which has a sufficiently wide field angle, that is, half field angle of 38 degrees or more at the short focal end and a magnification ratio of 8 times or more. The zoom lens also achieves small size with about 10 lenses configuration and resolution corresponding to an image pickup device having 10 to 15 million pixels.

A zoom lens according to an embodiment of the present invention includes a first lens group having a positive refractive power, a second lens group having a negative refractive power, a third lens group having a positive refractive power, and a fourth lens group having a positive refractive power, which are disposed in order from an object side to an image side, and an aperture stop disposed between the second and third lens groups. When changing the magnification of the zoom lens from a short focal end to a long focal end, an interval between the first and second lens groups increases, an interval between the second and third lens groups decreases, and an interval between the third and fourth lens groups increases. The first and third lens groups are moved so as to be positioned at object side positions at the long focal end relative to positions at the short focal end. The third lens group has two positive lenses including a first positive lens L_p1 and a second positive lens L_p2 which are disposed in order from an object side. In a case where a partial dispersion ratio $P_{g,F}$ is defined by the following equation:

$$P_{g,F} = (n_g - n_F)/(n_F - n_C)$$

where $n_g$, $n_F$, and $n_C$ are refractive indices of a positive lens for g, F, and C lines, respectively, the following conditions are satisfied:

$$3.1 < p1\_n_d + p2\_n_d < 3.4 \qquad (1)$$

$$60 < p1\_v_d < 80 \qquad (2)$$

$$60 < p2\_v_d < 80 \qquad (3)$$

$$0.008 < p1\_P_{g,F} - (-0.001802 \times p1\_v_d + 0.6483) < 0.050 \qquad (4)$$

$$0.008 < p2\_P_{g,F} - (-0.001802 \times p2\_v_d + 0.6483) < 0.050 \qquad (5),$$

where $p1\_n_d$ is a refractive index of the first positive lens L_p1, $p2\_n_d$ is a refractive index of the second positive lens L_p2, $p1\_v_d$ is an Abbe number of the first positive lens L_p1, $p2\_v_d$ is an Abbe number of the second positive lens L_p2, $p1\_P_{g,F}$ is a partial dispersion ratio of the first positive lens L_p1, and $p2\_P_{g,F}$ is a partial dispersion ratio of the second positive lens L_p2.

BRIEF DESCRIPTION OF THE DRAWINGS

FIG. 1(a) is a schematic sectional view of an optical system of a zoom lens according to an example 1 of a first embodiment of the present invention along an optical axis at a short focal (wide angle or "Wide") end.

FIG. 1(b) is a schematic sectional view of the optical system of the zoom lens according to the example 1 along the optical axis at a focal position (Wide-Mean) intermediate between the short focal end and an intermediate focal position.

FIG. 1(c) is a schematic sectional view of the optical system of the zoom lens according to the example 1 along the optical axis at the intermediate focal position (Mean).

FIG. 1(d) is a schematic sectional view of the optical system of the zoom lens according to the example 1 along the optical axis at a focal position (Mean-Tele) intermediate between the intermediate focal position and the long focal (telephoto, "Tele") end.

FIG. 1(e) is a schematic sectional view of the optical system of the zoom lens according to the example 1 along the optical axis at the long focal end.

FIG. 7(a) is a schematic sectional view of an optical system of a zoom lens according to an example 2 of the first embodiment of the present invention along an optical axis at a short focal (wide angle or "Wide") end.

FIG. 7(b) is a schematic sectional view of the optical system of the zoom lens according to the example 2 along the optical axis at a focal position (Wide-Mean) intermediate between the short focal end and an intermediate focal position.

FIG. 7(c) is a schematic sectional view of the optical system of the zoom lens according to the example 2 along the optical axis at the intermediate focal position (Mean).

FIG. 7(d) is a schematic sectional view of the optical system of the zoom lens according to the example 2 along the optical axis at a focal position (Mean-Tele) intermediate between the intermediate focal position and the long focal (telephoto, "Tele") end.

FIG. 7(e) is a schematic sectional view of the optical system of the zoom lens according to the example 2 along the optical axis at the long focal end.

FIG. 8 is a view illustrating aberration curves of spherical aberration, astigmatism, distortion, and coma aberration in the zoom lens according to the example 2 at the short focal end.

FIG. 9 is a view illustrating aberration curves of spherical aberration, astigmatism, distortion, and coma aberration in the zoom lens according to the example 2 at the intermediate focal position.

FIG. 10 is a view illustrating aberration curves of spherical aberration, astigmatism, distortion, and coma aberration in the zoom lens according to the example 2 at the long focal end.

FIG. 11 is a view illustrating axial chromatic aberration characteristic curves in the zoom lens according to the example 2 at the short and long focal ends.

FIG. 13(a) is a schematic sectional view of an optical system of a zoom lens according to an example 3 of the first embodiment of the present invention along an optical axis at a short focal (wide angle or "Wide") end.

FIG. 13(b) is a schematic sectional view of the optical system of the zoom lens according to the example 3 along the optical axis at a focal position (Wide-Mean) intermediate between the short focal end and an intermediate focal position.

FIG. 13(c) is a schematic sectional view of the optical system of the zoom lens according to the example 3 along the optical axis at the intermediate focal position (Mean).

FIG. 13(d) is a schematic sectional view of the optical system of the zoom lens according to the example 3 along the optical axis at a focal position (Mean-Tele) intermediate between the intermediate focal position and the long focal (telephoto, "Tele") end.

FIG. 13(e) is a schematic sectional view of the optical system of the zoom lens according to the example 3 along the optical axis at the long focal end.

FIG. 19(a) is a schematic sectional view of an optical system of a zoom lens according to an example 4 of the first embodiment of the present invention along an optical axis at a short focal (wide angle or "Wide") end.

FIG. 19(b) is a schematic sectional view of the optical system of the zoom lens according to the example 4 along the optical axis at a focal position (Wide-Mean) intermediate between the short focal end and an intermediate focal position.

FIG. 19(c) is a schematic sectional view of the optical system of the zoom lens according to the example 4 along the optical axis at the intermediate focal position (Mean).

FIG. 19(d) is a schematic sectional view of the optical system of the zoom lens according to the example 4 along the optical axis at a focal position (Mean-Tele) intermediate between the intermediate focal position and the long focal (telephoto, "Tele") end.

FIG. 19(e) is a schematic sectional view of the optical system of the zoom lens according to the example 4 along the optical axis at the long focal end.

FIG. 20 is a view illustrating aberration curves of spherical aberration, astigmatism, distortion, and coma aberration in the zoom lens according to the example 4 at the short focal end.

FIG. 21 is a view illustrating aberration curves of spherical aberration, astigmatism, distortion, and coma aberration in the zoom lens according to the example 4 at the intermediate focal position.

DETAILED DESCRIPTION OF THE PREFERRED EMBODIMENTS

Figure 2:
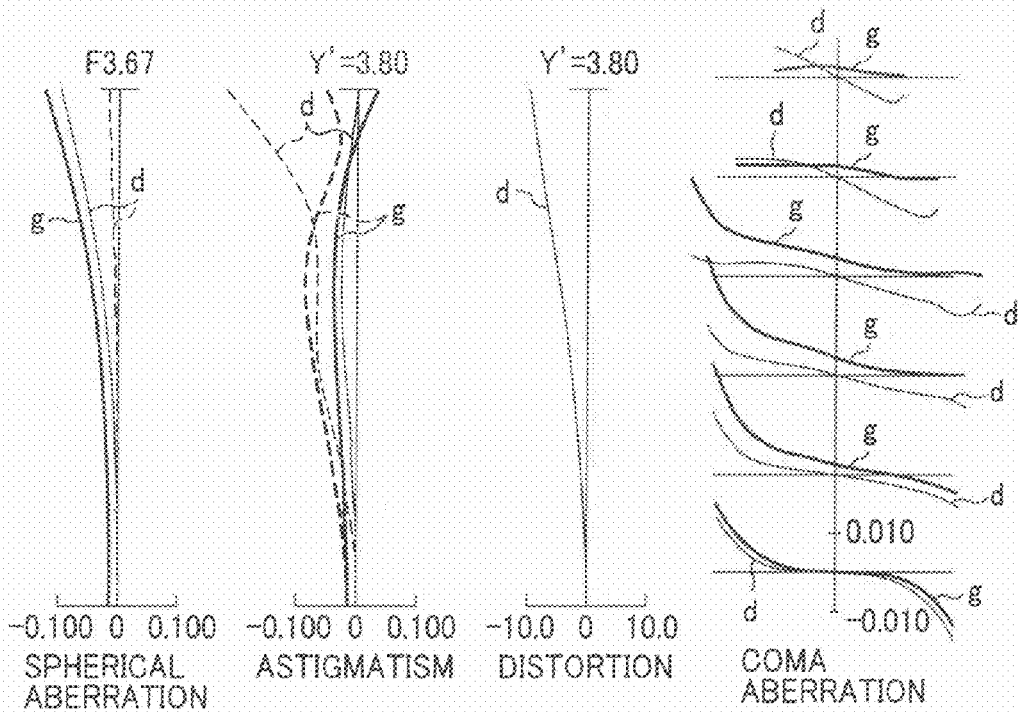
FIG. 2 is a view illustrating aberration curves of spherical aberration, astigmatism, distortion, and coma aberration in the zoom lens according to the example 1 at the short focal end.

Preferred embodiments of a zoom lens, an imaging apparatus and an information device according to the present invention will be explained in detail hereinafter with reference to the accompanying drawings. At first, a fundamental embodiment of the present invention will be explained prior to explanation on specific examples.

A zoom lens according to a first embodiment of the present invention includes a first lens group having a positive refractive power, a second lens group having a negative refractive power, a third lens group having a positive refractive power, and a fourth lens group having a positive refractive power, which are disposed in order from an object side to an image side. When changing the magnification of the zoom lens from a short focal end (wide angle end) to a long focal end (telephoto end), an interval between the first and second lens groups increases, an interval between the second and third lens groups decreases, and an interval between the third and fourth lens groups increases. The first and third lens groups are moved so as to be positioned at object side positions at the long focal end relative to positions at the short focal end.

Furthermore, the zoom lens according to the first embodiment of the present invention has the following features.

At first, an aperture stop is disposed between the second and third lens groups, the third lens group has two positive lenses, and the following conditions are satisfied.

$$3.1 < p1\_n_d + p2\_n_d < 3.4 \tag{1}$$

$$60 < p1\_v_d < 80 \tag{2}$$

$$60 < p2\_v_d < 80 \tag{3}$$

$$0.008 < p1\_P_{g,F} - (-0.001802 \times p1\_v_d + 0.6483) < 0.050 \tag{4}$$

$$0.008 < p2\_P_{g,F} - (-0.001802 \times p2\_v_d + 0.6483) < 0.050 \tag{5},$$

Here, the two positive lenses of the third lens group are a first positive lens L_p1 and a second positive lens L_p2 which are disposed in order from an object side. In the above conditions, $p1\_n_d$ is a refractive index of the first positive lens L_p1, $p2\_n_d$ is a refractive index of the second positive lens L_p2, $p1\_v_d$ is an Abbe number of the first positive lens L_p1, $p2\_v_d$ is an Abbe number of the second positive lens L_p2, $p1\_P_{g,F}$ is a partial dispersion ratio of the first positive lens L_p1, and $p2\_P_{g,F}$ is a partial dispersion ratio of the second positive lens L_p2.

A partial dispersion ratio $P_{g,F}$ is defined by the following equation:

$$P_{g,F} = (n_g - n_F)/(n_F - n_C)$$

where $n_g$, $n_F$, and $n_C$ are refractive indices of a positive lens for g, F, and C lines, respectively.

Next, the zoom lens according to the first embodiment of the present invention may have the following features. That is, the first positive lens L_p1 is disposed at a most object side in the third lens group and the second positive lens L_p2 is disposed next to the first positive lens.

The zoom lens according to the first embodiment of the present invention may have the following features. That is, the following condition is satisfied:

$$1.0 < f1\_3/fw < 1.8 \quad (10)$$

where f1_3 is a focal length of the first positive lens disposed at the most object side in the third lens group, and fw is a focal length of the entire zoom lens at the short focal end.

The zoom lens according to the first embodiment of the present invention may have the following features. That is, the following condition is satisfied:

$$0.5 < f1\_3/f2\_3 < 1.5 \quad (11)$$

where f1_3 is a focal length of the first positive lens L_p1 of the third lens group, and f2_3 is a focal length of the second positive lens L_p2 of the third lens group.

The zoom lens according to the first embodiment of the present invention may have the following features. That is, the third lens group includes a negative lens, and the following conditions are satisfied:

$$1.60 < n\_n_d < 1.90 \quad (12)$$

$$28.0 < n\_v_d < 45.0 \quad (13)$$

$$-0.01 < n\_P_{g,F} - (-0.001802 \times n\_v_d + 0.6483) < 0.008 \quad (14)$$

where n_n$_d$ is a refractive index of the negative lens of the third lens group, n_v$_d$ is an Abbe number of the negative lens of the third lens group, and n_P$_{g,F}$ is a partial dispersion ratio of the negative lens of the third lens group.

The zoom lens according to the first embodiment of the present invention may have the following features. That is, the third lens group includes a negative lens, and the following condition is satisfied:

$$-1.0 < fn\_3/fw < -0.4 \quad (15)$$

where fn_3 is a focal length of the negative lens of the third lens group, and fw is a focal length of the entire zoom lens at the short focal end.

The zoom lens according to the first embodiment of the present invention may have the following features. That is, the third lens group includes a positive lens, a positive lens and a negative lens, which are disposed in order from an object side, and the following condition is satisfied:

$$0.15 < (\Phi\_p1 - \Phi\_n2)/D3 < 0.3 \quad (16)$$

where Φ_p1 is a light flux effective diameter on an object side surface of the most object side positive lens in the third lens group, Φ_n2 is a light flux effective diameter on an image side surface of the negative lens of the third lens group, and D3 is a thickness of the third lens group on an optical axis.

The zoom lens according to the first embodiment of the present invention may have the following features. That is, the first positive lens L_p1 which is disposed at the most object side in the third lens group and satisfies the above condition(s) has an aspheric surface.

As the first embodiment of the present invention, in the zoom lens having four lens groups of positive-negative-positive-positive lens groups, generally, the second lens group is configured as a "variator" which has a main magnification function. However, in the zoom lens according to the first embodiment of the present invention, the third lens group also has a magnification function to reduce the burden of the second lens group so that degree of correction freedom for an aberration correction which is difficult in a wider angle- and higher magnification-zoom lens is ensured. Furthermore, if the first lens group is configured to be moved toward the object side when changing the magnification of the zoom lens from the short focal end to the long focal end, a height of a light beam passing through the first lens group at the short focal end is lowered. Accordingly, the zoom lens is configured such that the size of the first lens group is prevented from increasing in a wider angle zoom lens and a sufficient interval between the first and second lens groups at the long focal end is ensured to achieve longer focal length.

When changing the magnification of the zoom lens from the short focal end to the long focal end, the interval between the first and second lens groups increases, the interval between the second and third lens groups decreases and therefore both of the magnifications (in absolute values) of the second and third lens groups increase to share the magnification functions with each other.

Then, the zoom lens according to the first embodiment of the present invention includes the third lens group having two positive lenses and the following conditions are satisfied.

$$3.1 < p1\_n_d + p2\_n_d < 3.4 \quad (1)$$

$$60 < p1\_v_d < 80 \quad (2)$$

$$60 < p2\_v_d < 80 \quad (3)$$

$$0.008 < p1\_P_{g,F} - (-0.001802 \times p1\_v_d + 0.6483) < 0.050 \quad (4)$$

$$0.008 < p2\_P_{g,F} - (-0.001802 \times p2\_v_d + 0.6483) < 0.050 \quad (5),$$

Here, the two positive lenses of the third lens group are a first positive lens L_p1 and a second positive lens L_p2 which are disposed in order from an object side and p1_n$_d$ is a refractive index of the first positive lens L_p1, p2_n$_d$ is a refractive index of the second positive lens L_p2, p1_v$_d$ is an Abbe number of the first positive lens L_p1, p2_v$_d$ is an Abbe number of the second positive lens L_p2, p1_P$_{g,F}$ is a partial dispersion ratio of the first positive lens L_p1, and p2_P$_{g,F}$ is a partial dispersion ratio of the second positive lens L_p2.

A partial dispersion ratio P$_{g,F}$ is defined by the following equation:

$$P_{g,F} = (n_g - n_F)/(n_F - n_C)$$

where n$_g$, n$_F$, and n$_C$ are refractive indices of a positive lens for g, F, and C lines, respectively.

If the focal length of the zoom lens especially at the long focal end is increased, it is difficult to correct a secondary spectrum in the axial chromatic aberration at the telephoto end. If the focal length of the zoom lens especially at the short focal end is reduced, that is, wide angle at the short focal end is increased, it is difficult to correct a secondary spectrum in chromatic aberration of magnification at the wide angle end. In this embodiment of the present invention, these chromatic aberrations are to be corrected by use of anomalous dispersion material (material having a large anomalous dispersion characteristic) and the zoom lens according to this embodiment of the present invention is largely characterized by used parts and optical properties.

In general, in order to reduce the secondary spectrum in the axial chromatic aberration, a special low dispersion glass is used for lens groups having large heights of light fluxes from an optical axis to achieve a large effect. The third lens group has a second height of the light fluxes from the optical axis after the first lens group and therefore the secondary spectrum in the axial chromatic aberration may be sufficiently reduced by use of the anomalous dispersion glass. In the zoom lens according to the first embodiment of the present invention, it is possible to correct the aberrations by use of the two lenses through which light fluxes pass in different ways. Accordingly, the secondary spectrum in the axial chromatic aberration or the chromatic aberration of magnification can be sufficiently reduced.

However, generally, an optical material having special low dispersion characteristics has a low refractive index so that correction ability of monochromatic aberration is degraded. Therefore, if the third lens group is formed by a small number of lenses and the monochromatic and chromatic aberrations are reduced with a well balance, sufficient effects are not necessarily achieved even when using the special low dispersion optical material.

That is, when the values of the condition (1) is less than the lower limit, the monochromatic aberration is not sufficiently corrected, when the values of the conditions (2) and (3) are less than the lower limits, the chromatic aberration is not sufficiently corrected, when the conditions (4) and (5) are less than the lower limits, the secondary spectrum in the chromatic aberration is not sufficiently corrected. On the other hand, regarding all of the conditions (1) to (5), there is no optical material having values over the upper limits of these conditions, or if exists, very few and high cost materials may have the values over the upper limits and therefore using these optical materials is not practical.

With respect to refractive indices, the following conditions are preferably satisfied.

$$1.55 < p1\_n_d < 1.7 \quad (6)$$

$$1.55 < p2\_n_d < 1.7 \quad (7)$$

By satisfying the conditions (6) and (7), it is possible to allow the two positive lenses to share correcting function for correcting the aberrations to sufficiently reduce the monochromatic aberration.

Further, with respect to dispersion, the following condition is preferably satisfied.

$$130 < p1\_v_d + p2\_v_d < 150 \quad (8)$$

By satisfying the condition (8), it is possible to sufficiently reduce the axial chromatic aberration and the chromatic aberration of magnification.

Furthermore, with respect to anomalous dispersion characteristics, the following condition is preferably satisfied.

$$0.025 < (p1\_P_{g,F} + p2\_P_{g,F}) - (-0.001802 \times (p1\_v_d + p2\_v_d) + 0.6483) < 0.070 \quad (9)$$

By satisfying the condition (9), it is possible to sufficiently reduce the secondary spectrum in the axial chromatic aberration and the chromatic aberration of magnification.

In order to further sufficiently correct the secondary spectrum in the axial chromatic aberration, it is preferable to dispose, at the most object side in the third lens group, two positive lenses, that is, the first positive lens L_p1 and the second positive lens L_p2 satisfying the above conditions (1) to (5).

That is, the special low dispersion glass may be used for the lens group having a large height of the light fluxes from the optical axis to achieve an large effect and the positive lens at the most object side in the third lens group has the most large height of the light fluxes from the optical axis in the third lens group so that the large effect can be achieved.

In order to further correct the monochromatic aberration and the chromatic aberration, the following condition is preferably satisfied.

$$1.0 < f1\_3/fw < 1.8 \quad (10)$$

where f1_3 is a focal length of the first positive lens disposed at the most object side in the third lens group, and fw is a focal length of the entire zoom lens at the short focal end.

In the above condition (10), if the value of the condition (10) is more than the upper limit, the refractive power of the lens of the anomalous dispersion material becomes small and therefore the effect due to the anomalous dispersion characteristic becomes small so that it is possible not to sufficiently correct the chromatic aberration. On the other hand, if the value of the condition (10) is less than the lower limit, it is difficult to achieve well balance in the correction of the chromatic aberration and the spherical aberration. Further, there is disadvantage in a processing accuracy because of increased curvature factor of each surface of the lenses.

In order to further correct the monochromatic aberration and the chromatic aberration, the following condition is preferably satisfied.

$$0.5 < f1\_3/f2\_3 < 1.5 \quad (11)$$

where f1_3 is a focal length of the first positive lens of the third lens group, and f2_3 is a focal length of the second positive lens of the third lens group.

If the two positive lenses of the third lens group have refractive powers with a well balance, it is possible to share the correction of the monochromatic aberration and the chromatic aberration. In the condition (11), if the value is more than the upper limit or less than the lower limit, the aberrations cannot be corrected with a well balance so that it is difficult to reduce the monochromatic aberration and the chromatic aberration.

In order to further reduce mainly the chromatic aberration, the third lens group preferably includes a negative lens and the following conditions are preferably satisfied.

$$1.60 < n\_n_d < 1.90 \quad (12)$$

$$28.0 < n\_v_d < 45.0 \quad (13)$$

$$-0.01 < n\_P_{g,F} - (-0.001802 \times n\_v_d + 0.6483) < 0.008 \quad (14)$$

where $n\_n_d$ is a refractive index of the negative lens of the third lens group, $n\_v_d$ is an Abbe number of the negative lens of the third lens group, and $n\_P_{g,F}$ is a partial dispersion ratio of the negative lens of the third lens group.

If these conditions (12) to (14) are satisfied, it is possible to achieve a well balance of the two positive lenses of the third lens group. Accordingly, it is possible to sufficiently reduce the axial chromatic aberration and the chromatic aberration of the magnification while reducing the monochromatic aberration. If the values of the conditions (12) to (14) are more than the upper limits or less than the lower limits, the aberration cannot be corrected with a well balance, and it becomes difficult to reduce the axial chromatic aberration and the chromatic aberration of magnification while reducing the monochromatic aberration.

In order to further correct the monochromatic aberration and the chromatic aberration, the following condition is preferably satisfied.

$$-1.0 < fn\_3/fw < -0.4 \quad (15)$$

where fn_3 is a focal length of the negative lens of the third lens group, and fw is a focal length of the entire zoom lens at the short focal end.

If the condition (15) is satisfied, a well balance of the two positive lens of the third lens group can be achieved and then it is possible to sufficiently reduce the axial chromatic aberration and the chromatic aberration of magnification while reducing the monochromatic aberration. If the value is more than the upper limit or less than the lower limit, the aberration cannot be corrected with the well balance and it becomes difficult to sufficiently reduce the axial chromatic aberration and the chromatic aberration of magnification while reducing the monochromatic aberration.

In order to further correct the monochromatic aberration and the chromatic aberration, the third lens group may includes positive lens—positive lens—negative lens which are disposed in order from the object side and the following condition is preferably satisfied.

$$0.15 < (\Phi\_p1 - \Phi\_n2)/D3 < 0.3 \quad (16)$$

where $\Phi\_p1$ is a light flux effective diameter on an object side surface of the most object side positive lens in the third lens group, $\Phi\_n2$ is a light flux effective diameter on an image side surface of the negative lens of the third lens group, and D3 is a thickness of the third lens group on an optical axis.

In order to achieve the small size and low aspheric aberration, the first positive lens L_p1 and the second positive lens L_p2 which are disposed at most object side and satisfy the conditions (1) to (5) are preferably aspheric lenses. That is, such an aspheric surface for correcting the aspheric aberration is preferably used at a position close to the aperture stop.

In the condition (16), if the value is more than the upper limit, it becomes difficult to correct each aberration in the third lens group. Furthermore, influence due to variation of thickness and/or lens intervals in the third lens group becomes large so that processing and assembling becomes difficult. In the condition (16), if the value is less than the lower limit, the thickness of the third lens group increases. Accordingly, it is necessary to reduce the thickness of the other lens groups in order to achieve a small size and therefore it becomes difficult to correct each aberration in the other lens groups.

It is preferable that an interval between the aperture stop and the third lens group at the short focal end be set to be larger than that at the long focal end. That is, the third lens group using the anomalous dispersion material is disposed far from the aperture stop at the short focal end and close to the aperture stop at the long focal end, so that the anomalous dispersion characteristics are effective for correcting the secondary spectrum in the chromatic aberration of magnification at the short focal end and effective for correcting the secondary spectrum in the axial chromatic aberration at the long focal end. Accordingly, appropriate correction of the chromatic aberration in whole range of the magnification can be achieved. Furthermore, it is possible that the aperture stop is disposed close to the first lens group at the short focal end and the height of the light fluxes passing the first lens group can be further reduced. Accordingly, further reduced size of the first lens group can be achieved.

As described above, if the interval between the aperture stop and the third lens group is increased at the short focal end than the long focal end, regarding the interval between the aperture stop and the third lens group, the following condition is preferably satisfied:

$$0.05 < d_{SW}/f_T < 0.20 \quad (17)$$

where $d_{SW}$ is an interval between the aperture stop and the most object side surface of the third lens group at the short focal end on an optical axis, and $f_T$ is a focal length of the entire zoom lens at the long length focal end.

In the condition (17), if the value is less than the lower limit, heights of the light fluxes passing the third lens group at the short focal end decrease so that the secondary spectrum in the chromatic aberration of magnification cannot be effectively reduced. In addition, similarly, the heights of the light fluxes passing the first lens group at the short focal end are so increased that the large size first lens group is required. On the other hand, in the condition (17), if the value is more than the upper limit, height of the light fluxes passing the third lens group at the short focal end are so increased that curvature of field is generated at a positive side or a barreled shaped distortion becomes large. Accordingly, it becomes difficult to ensure good performance, especially at a wide angle region.

By increasing an opened diameter of the aperture stop at the long focal end more than the short focal end, change in F number during changing the magnification can be reduced. If it is necessary to reduce an amount of light entering the image plane, it is preferable that the aperture stop having a small diameter is used or more preferably that without changing the diameter of the aperture stop, an ND filter (intermediate concentration filter) or the like is inserted to reduce the light amount so that degrade of a resolving power due to diffraction phenomenon can be suppressed.

Furthermore, a focusing operation may be performed by extending in total but it is preferable to perform the focusing operation by moving only the fourth lens group.

In the above description, the basic configurations of the zoom lens according to the first embodiment of the present invention are explained. Detailed configurations of the zoom lens according to the first embodiment of the present invention will be explained based on the later-described specific numeric examples with reference to FIGS. 1 to 24.

Figure 25:
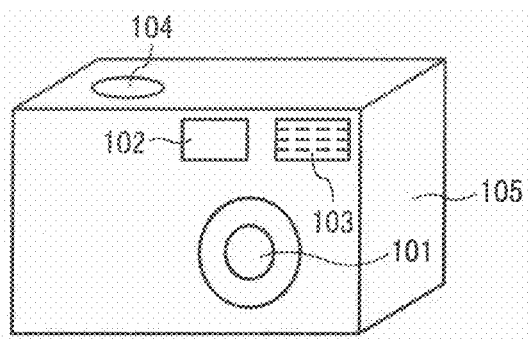
FIG. 25 is a perspective view schematically illustrating an external appearance configuration of a digital camera as an imaging apparatus according to a second embodiment of the present invention, as viewed from an object side.
Figure 26:
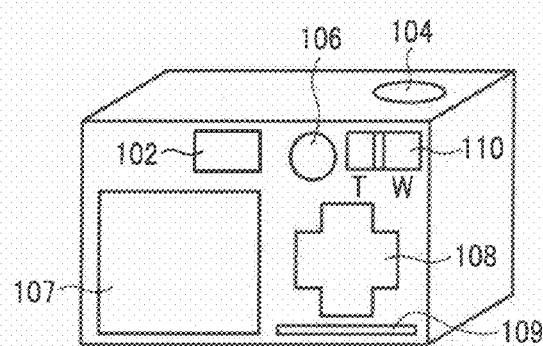
FIG. 26 is a perspective view schematically illustrating an external appearance configuration of the digital camera of FIG. 25, as viewed from a photographer side.
Figure 27:
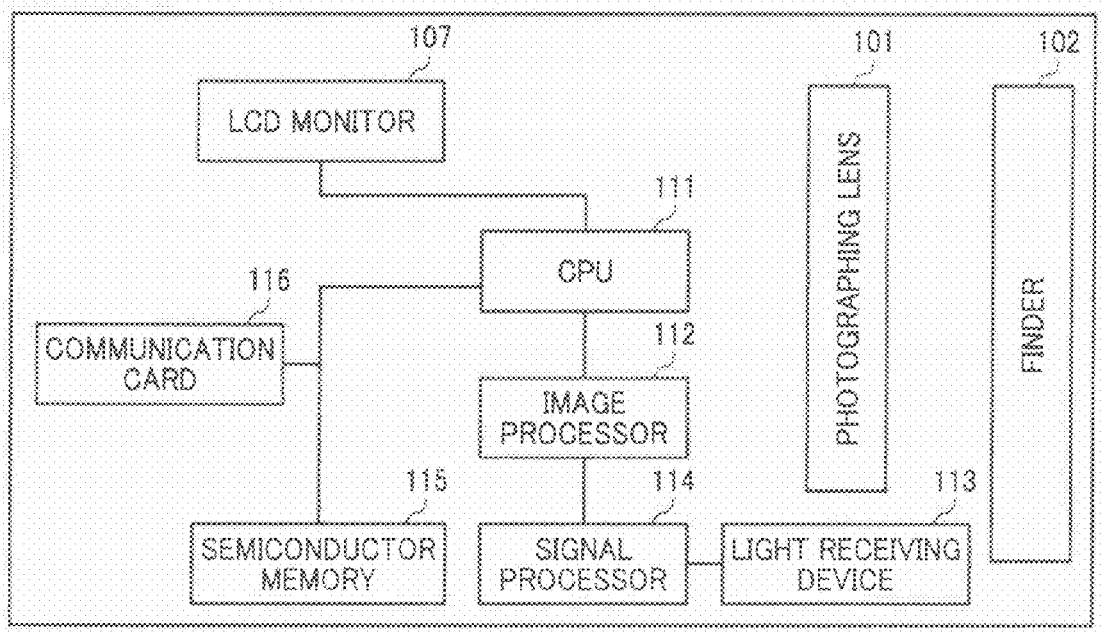
FIG. 27 is a block diagram schematically illustrating a functional configuration of the digital camera of FIG. 25.

Next, a digital camera as an imaging apparatus according to a second embodiment of the present invention, having the zoom lens according to the first embodiment of the present invention as a photographic optical system will be explained with reference to FIGS. 25 to 27. FIG. 25 is a perspective view schematically illustrating an external appearance configuration of the digital camera, as viewed from a front side which is an object side, that is, a subject side. FIG. 26 is a perspective view schematically illustrating an external appearance configuration of the digital camera of FIG. 25, as viewed from a photographer side, that is, a back side. FIG. 27 is a block diagram schematically illustrating a functional configuration of the digital camera of FIG. 25. Here, although the digital camera is explained as an example of the imaging apparatus, a zoom lens according to an embodiment of the present invention may be used in a silver-salt film camera using a silver salt film as a conventional image recording medium. An information device such as a so-called PDA (personal data assistant) or a portable information terminal, for example, a mobile phone, having a camera function has been widely used. Although such an information device has a different external appearance from that of the digital camera, it may have substantially similar configurations and functions to the digital camera. Accordingly, the zoom lens according to an embodiment of the present invention may be used as a photographic optical system in such an information device.

As shown in FIGS. 25 and 26, the digital camera includes a photographic lens 101, an optical finder 102, a strobe (flash light) 103, a shutter button 104, a camera body 105, a power switch 106, a liquid crystal monitor 107, an operation button 108, a memory card slot 109, and a zoom switch 110, and the like. As shown in FIG. 27, the digital camera includes a central processing unit (CPU) 111, an image processor 112, a light receiving device 113, a signal processor 114, a semiconductor memory 115 and a communication card, and the like.

The digital camera has the photographic lens 101 as an photographic optical system, the light receiving device 113 configured as an image sensor using a CMOS (complementary metal-oxide semiconductor) image pickup device, a CCD (charge-coupled device) image pickup device or the like to read by the light receiving device 113 an optical subject image imaged by the photographic lens 101. As the photographic lens 101, the zoom lens according to an embodiment of the present invention as explained in the above described first embodiment is used.

An output of the light receiving device 113 is processed by the signal processor 114 controlled by the CPU 111 and the processed output is converted into digital image information. That is, such a digital camera includes a device for converting a photographed image (subject image) into digital image information. The device is substantially configured by the light receiving device 113, the signal processor 114 and the CPU 111 controlling these devices, and the like.

Predetermined image processing on the digital image information digitalized by the signal processor 114 is performed in the image processor 112 controlled by the CPU and then the processed digital image is stored in the semiconductor memory 115 such as a nonvolatile memory or the like. In this case, the semiconductor memory 115 may be a memory card installed in the memory card slot 109 or a semiconductor memory built in the camera body on board. On the liquid crystal monitor 107, an image during photographing and also an image stored in the semiconductor memory 115 can be displayed. The image stored in the semiconductor memory 115 can be transmitted to external devices via the communication card 116 loaded in the not illustrated communication card slot.

When the camera is carried, an object side surface of the photographic lens 101 is covered with a not-illustrated lens barrier. When a user turns on the power by operating the power switch 106, the lens barrier is opened to expose an object side surface. At this time, in a barrel of the photographic lens, an optical system of each of optical groups is disposed in, for example, a short focal end (wide angle end) position. By operating the zoom switch 110, the position of the optical system of each of optical groups is changed to change magnification to the long focal end (telephoto end) via the intermediate focal length position. Further, it is preferable that magnification of the optical system of the optical finder 102 is changed in conjunction with change in field angle of the photographic lens 101.

In many cases, focusing is performed by a half-pressing operation of the shutter button 104. Focusing in the zoom lens according to an embodiment of the present invention may be performed by moving at least a part of optical systems of optical groups constituting the zoom lens or the light receiving device. When the shutter button 104 is full-pressed, the photographing is performed and then the above described processings are performed.

When the image stored in the semiconductor memory 115 is displayed on the liquid crystal monitor 107 or is transmitted to the external devices via the communication card 116, the operation button 108 is operated as predetermined. The semiconductor memory 115 and the communication card 116 are loaded in an exclusive or universal slot such as the memory card slot 109, a communication card slot, or the like to be used.

In the above described digital camera (imaging apparatus) or information device, the photographic lens 101 configured by the zoom lens according to the first embodiment of the present invention may be used as a photographic optical system. Accordingly, high image quality and small size digital camera or information device using the light receiving device of ten to fifteen million pixels or more can be achieved.

(Example 1)

Next, examples of the specific zoom lenses according to the first embodiment of the present invention will be explained in detail. Examples 1 to 4 show specific configurations with specific numeric examples of the zoom lens of the first embodiment of the present invention.

Each of Examples 1 to 4 shows, as described above, the zoom lens having four groups of positive-negative-positive-positive lens groups, and maximum image height in Examples 1 to 4 is 4.05 mm.

Reference numeral "FM" in Examples 1 to 4 indicates a parallel plate optical element which is provided at an image side of the fourth lens group and may be one of various types of optical filter such as an optical low-pass filter, an infrared cut filter and the like or may be a cover glass (seal glass) for an image pickup device such as a CMOS image sensor, a CCD sensor, or the like.

For material for forming lenses in the zoom lens of Examples 1 to 4, optical glass is used except for material for the positive lens of the fourth lens group in the zoom lens of Example 2, which is optical plastic.

In Examples 1 to 4, each of both surfaces of the most object side lens of the second lens group, both surfaces of the most object side lens of the third lens group, and the most object side surface of the fourth lens group is aspheric. The aspheric surfaces in Examples 1 to 4 are explained as a surface of each lens is directly formed as an aspheric surface, but a resin thin film is provided on a lens surface of a spherical lens to form an aspheric surface, that is, to form a hybrid aspheric surface to obtain the aspheric lens.

Aberration in Examples 1 to 4 is sufficiently corrected and therefore the light receiving device of ten to fifteen million pixels or more may be used. By the configuration of the zoom lens of the first embodiment of the present invention, it is clearly found by Examples 1 to 4, that small size is sufficiently achieved while ensuring high imaging performance.

Figure 28:
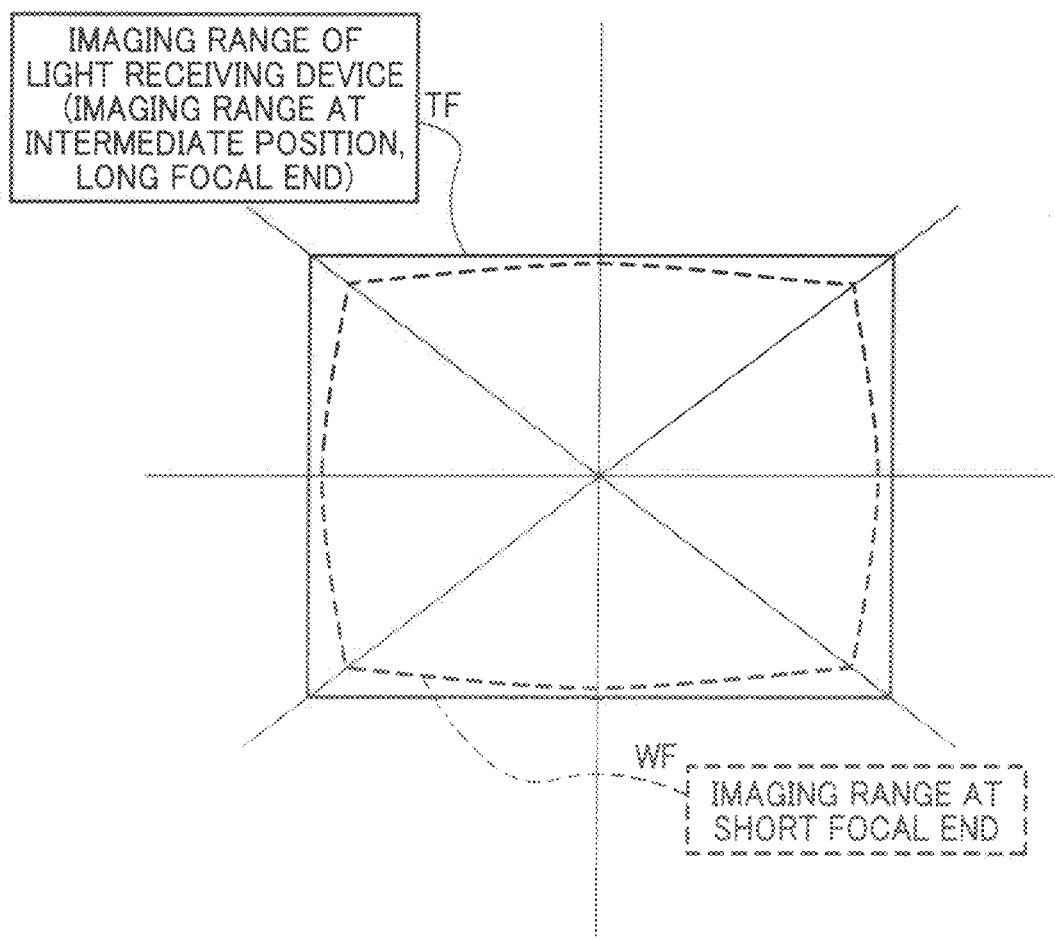
FIG. 28 is a schematic view illustrating an imaging field for explaining an electronic correction of distortion by use of image processing used in an embodiment of the present invention.

In the zoom lens of Examples 1 to 4, as described above, distortion is corrected by image processing. That is, in the zoom lens of Examples 1 to 4, as shown in FIG. 28 by TF which is an imaging range of the light receiving device (imaging range at the intermediate focal position and the long focal end (telephoto end) and WF which is an imaging range at the short focal end (wide angle end), barreled shape distortion as shown by the imaging range WF is generated on a rectangular light receiving surface TF of the light receiving device at the short focal end.

On the other hand, generation of distortion is suppressed at or in vicinity of the intermediate focal position or at the long focal end and at the long focal end. In order to electrically correct the distortion, the effective imaging range is the barreled shape range (WF) at the short focal end, and is a rectangular shape range (TF) at the intermediate focal position and at the long focal end. Image processing on the effective imaging range (WF) at the short focal end is performed to form image information having a rectangular shape with the distortion reduced. Therefore, in Examples 1 to 4, image height at the short focal end is set to be reduced relative to the image height at the intermediate focal position and the long focal end.

The following reference numbers are commonly used in Examples 1 to 4.

| | |
|---|---|
| f: | focal length of an entire system of the zoom lens |
| F: | F number (F value) |
| ω: | half field angle |
| R: | curvature radius |
| D: | surface interval |
| $N_d$: | refracting index |
| $v_d$: | Abbe number |
| Φ: | light flux effective diameter |
| K: | conic constant of aspheric surface |
| $A_4$: | fourth order aspheric coefficient |
| $A_6$: | sixth order aspheric coefficient |
| $A_8$: | eighth order aspheric coefficient |
| $A_{10}$: | tenth order aspheric coefficient |

An aspheric form used in the following examples is defined by the following equation (18):

$$X = \frac{CH^2}{1 + \sqrt{\{1 - (1+K)C^2H^2\}}} + A_4 \cdot H^4 + A_6 \cdot H^6 + A_8 \cdot H^8 + A_{10} \cdot H^{10} \quad (18)$$

where C is an inverse of a paraxial curvature radius (paraxial curvature), and H is a height of the light flux from the optical axis.

FIG. 1 shows schematic sectional views of an optical system of the zoom lens according to Example 1 of the first embodiment of the present invention along an optical axis (a) at the short focal length (wide angle or "Wide") end, (b) at a focal length position (Wide-Mean) intermediate between the short focal end and an intermediate focal position, (c) at the intermediate focal position (Mean), (d) at a focal length position (Mean-Tele) intermediate between the intermediate focal position and the long focal (telephoto, "Tele") end, and (e) at the long focal end.

In FIG. 1 showing the lens groups of Example 1, an object side (subject side) is indicated at a left side of the drawing.

The zoom lens shown in FIG. 1, along the optical axis, includes a first lens group G1 having a positive refractive power, a second lens group G2 having a negative refractive power, a third lens group G3 having a positive refractive power, and a fourth lens group G4 having a positive refractive power, which are disposed in order from the object side, and an aperture stop AD disposed between the second lens group G2 and the third lens group G3. The first lens group G1 includes a first lens L11, a second lens L12 and a third lens L13, the second lens group G2 includes a first lens L21, a second lens L22, and a third lens L23, the third lens group G3 includes a first lens L31, a second lens L32, and a third lens L33, and the fourth lens group G4 includes a single lens L40.

Each of the first to fourth lens groups G1 to G4 is appropriately commonly supported by a common support frame or the like and when zooming, each lens group is integrally operated and the aperture stop AD is operated independently from each lens group. In FIG. 1, surface numbers of optical surfaces are shown. In addition, the same reference numbers are independently used in each Example for sake of simplicity and therefore the configuration indicated by the same reference number is not always the same configuration.

When changing the magnification of the zoom lens from the wide angle end (short focal end) to the telephoto end (long focal end), all of the first to fourth lens groups G1 to G4 are moved such that an interval between the first lens group G1 and the second lens group G2 is increased, an interval between the second lens group G2 and the third lens group G3 is decreased and an interval between the third lens group G3 and the fourth lens group G4 is increased. The first and third lens groups G1 and G3 are moved to be positioned at object side positions at the long focal end relative to positions at the short focal end.

The first lens group G1 has the first lens (a negative lens) L11 formed by a negative meniscus lens having a convex surface at an object side, the second lens (a first positive lens) L12 formed by a biconvex positive lens having a more largely convex surface at an object side, and the third lens (a second positive lens) L13 formed by a positive meniscus lens having a convex surface at an object side, which are disposed in order from the object side. The first lens L11 and the second lens L12 are closely stuck and cemented together with each other to form a cemented lens formed by the two lenses.

The second lens group G2 has the first lens (a first negative lens) L21 formed by an aspheric biconcave negative lens having a more largely concave surface at an image side, both surfaces being aspheric, the second lens (a second negative lens) L22 formed by a plano-concave negative lens having a flat surface at an object side and a concave surface at an image side, and the third lens (a positive lens) L23 formed by a positive meniscus lens having a convex surface at an object side, which are disposed in order from the object side.

The aperture stop AD is disposed between the second and third lens groups G2 and G3.

The third lens group G3 has the first lens (a first positive lens) L31 formed by an aspheric biconvex positive lens having a more largely convex surface at an object side, both surfaces being aspheric, the second lens (a second positive lens) L32 formed by a biconvex positive lens having a more largely convex surface at an image side, and the third lens (a negative lens) L33 formed by a biconcave negative lens having a more largely concave surface at an image side, which are disposed in order from the object side. The second lens L32 and the third lens L33 are closely stuck and cemented together with each other to form a cemented lens formed by the two lenses.

The fourth lens group G4 has only the single positive lens L40 formed by a biconvex positive lens having a more largely convex surface at an object side, which is an aspheric lens having an aspheric surface at the object side.

As described above, the third lens group G3 is configured by the positive lens L31—the positive lens L32—the negative lens L33, which are disposed in order from the object side, so that a principal point of the third lens group G3 may be set at the object side and therefore magnification of the third lens group can be advantageously changed.

In the positive lens L31 at the most object side in the third lens group G3, height of light fluxes from the optical axis is most increased in the third lens group G3 so that there is a large advantage for the axial chromatic aberration. Off-axis light fluxes passing the positive lens L32 of the third lens group pass in different way from off-axis light fluxes passing the positive lens L31. Accordingly, the correction is shared by the positive lenses L31 and L32 so that the secondary spectrum of the chromatic aberration of magnification can be effectively reduced.

In Example 1, the focal length f of the entire optical system, the F number F, and the half field angle ω are changed within ranges of f=5.04 to 51.98, F=3.67 and 5.69, and ω=39.99 to 4.42, respectively. The optical properties of each optical element are as follows.

TABLE 1

OPTICAL PROPERTIES

| Surface No. | R | D | n | ν | Φ | GLASS | NOTE | |
|---|---|---|---|---|---|---|---|---|
| 1 | 48.455 | 0.81 | 2.00069 | 25.46 | 21.20 | TAFD40(HOYA) | L11 | G1 |
| 2 | 24.864 | 3.10 | 1.59282 | 68.63 | 19.60 | FCD505(HOYA) | L12 | |
| 3 | −198.425 | 0.20 | | | 19.40 | | | |
| 4 | 19.430 | 2.40 | 1.72916 | 54.68 | 18.00 | S-LAL18(OHARA) | L13 | |
| 5 | 58.590 | Variable DA | | | 17.60 | | | |

TABLE 1-continued

OPTICAL PROPERTIES

| Surface No. | R | D | n | ν | Φ | GLASS | NOTE | |
|---|---|---|---|---|---|---|---|---|
| 6* | −181.667 | 0.80 | 1.80610 | 40.88 | 11.00 | L-LAH53(OHARA) | L21 | G2 |
| 7* | 5.118 | 2.08 | | | 7.60 | | | |
| 8 | ∞ | 0.84 | 1.81600 | 46.62 | 7.40 | S-LAH59(OHARA) | L22 | |
| 9 | 10.835 | 0.20 | | | 7.00 | | | |
| 10 | 8.016 | 1.57 | 1.92286 | 18.90 | 7.00 | S-NPH2(OHARA) | L23 | |
| 11 | 23.529 | Variable DB | | | 6.40 | | | |
| 12 | Aperture stop | Variable DC | | | 3.30 | | AD | |
| 13* | 5.919 | 2.64 | 1.56907 | 71.30 | 7.00 | KGFK70(SUMITA) | L31 | G3 |
| 14* | −9.921 | 0.28 | | | 7.00 | | | |
| 15 | 9.322 | 2.29 | 1.59282 | 68.63 | 6.40 | FCD505(HOYA) | L32 | |
| 16 | −5.929 | 0.80 | 1.83400 | 37.16 | 6.00 | S-LAH60(OHARA) | L33 | |
| 17 | 5.000 | Variable DD | | | 5.40 | | | |
| 18* | 10.000 | 2.48 | 1.51633 | 64.06 | 9.00 | L-BSL7(OHARA) | L40 | G4 |
| 19 | −177.140 | Variable DE | | | 9.00 | | | |
| 20 | ∞ | 0.80 | 1.50000 | 64.00 | 8.60 | FILTER | FM | |
| 21 | ∞ | — | | | 8.60 | | | |

In Table 1, the lens surface indicated by adding "*" (asterisk) is aspheric surface. After a glass type name, a name of a manufacture is abbreviated to HOYA (HOYA CORPORATION), OHARA (OHARA INC.), and SUMITA (SUMITA OPTICAL GLASS INC.), as used in other Examples.

That is, in Table 1, each of 6th, 7th, 13th, 14th, and 18th optical surfaces is aspheric and indicated by asterisk, and the parameters in the equation (18) for each aspheric surface are as follows.

TABLE 2

ASPHERIC COEFFICIENTS

| | K | A4 | A6 | A8 | A10 |
|---|---|---|---|---|---|
| 6 | 0 | 3.65375E−04 | −1.01671E−05 | 1.58629E−07 | −1.16699E−09 |
| 7 | 0 | 3.97900E−04 | 9.27671E−06 | 1.00972E−08 | 8.49598E−09 |
| 13 | 0 | −6.95856E−04 | 2.68379E−05 | −2.87652E−06 | 1.13202E−07 |
| 14 | 0 | 2.87561E−04 | 4.42676E−05 | −4.06069E−06 | 1.64109E−07 |
| 18 | 0 | −2.64154E−05 | 1.34731E−06 | −6.86639E−08 | 1.53214E−09 |

In Example 1, the focal length f of the entire optical system, the F number F, the half field angle ω, a variable interval DA between the first lens group G1 and the second lens group G2, a variable interval DB between the second lens group G2 and the aperture stop AD, a variable interval DC between the aperture stop AD and the third lens group G3, a variable interval DD between the third lens group G3 and the fourth lens group G4, and a variable interval DE between the fourth lens group G4 and the filter are respectively changed as shown in the following table when zooming.

TABLE 3

VARIABLE INTERVALS

| | SHORT FOCAL END (Wide) | SHORT-INTER-MEDIATE (W-M) | INTER-MEDIATE FOCAL POSITION (Mean) | INTER-MEDIATE-LONG (M-T) | LONG FOCAL END (Tele) |
|---|---|---|---|---|---|
| f | 5.04 | 8.99 | 15.98 | 28.97 | 51.98 |
| F | 3.67 | 4.63 | 5.08 | 4.96 | 5.69 |
| NUMBER ω | 39.99 | 25.41 | 14.60 | 8.09 | 4.42 |
| DA | 0.600 | 2.735 | 8.830 | 14.899 | 17.599 |
| DB | 10.366 | 5.492 | 3.040 | 0.800 | 0.800 |
| DC | 5.044 | 4.147 | 3.512 | 3.465 | 0.950 |
| DD | 3.500 | 6.245 | 6.282 | 5.947 | 11.465 |
| DE | 2.960 | 4.587 | 6.518 | 5.994 | 2.272 |

An opening diameter of the aperture stop AD at the long focal (Tele) end is φ3.8, and image height Y' is 4.15. Referring to FIG. 28, as described above, in order to correct the distortion by performing image processing, the imaging range at the long focal end (and the intermediate focal position) is almost matched with the imaging range of the light receiving device to be a rectangular imaging range. Then, Y'=3.80 at the short focal (wide) end to generate distortion so as to form a barreled shape imaging range at the short focal end. Then, image processing on the effective barreled shape imaging range at the short focal end is performed to form rectangular image information with the distortion reduced.

Accordingly, values corresponding to the conditions (1) to (17), which are shown as follows, satisfy the conditions (1) to (17).

TABLE 4

CONDITIONS

| | | |
|---|---|---|
| CONDITIONS(1) | $p1\_n_d + p2\_n_d$ | 3.16189 |
| CONDITIONS(2) | $p1\_v_d$ | 71.30 |
| CONDITIONS(3) | $p2\_v_d$ | 68.63 |
| CONDITIONS(4) | $p1\_P_{g,F} - (-0.001802 \times p1\_v_d + 0.6483)$ | 0.0252 |
| CONDITIONS(5) | $p2\_P_{g,F} - (-0.001802 \times p2\_v_d + 0.6483)$ | 0.0194 |
| CONDITIONS(6) | $p1\_n_d$ | 1.56907 |
| CONDITIONS(7) | $p2\_n_d$ | 1.59282 |
| CONDITIONS(8) | $p1\_v_d + p2\_v_d$ | 139.93 |
| CONDITIONS(9) | $(p1\_P_{g,F} + p2\_P_{g,F}) - (-0.001802 \times (p1\_v_d + p2\_v_d) + 0.6483)$ | 0.0446 |
| CONDITIONS(10) | $f1\_3/fw$ | 1.375 |
| CONDITIONS(11) | $f1\_3/f2\_3$ | 1.071 |
| CONDITIONS(12) | $n\_n_d$ | 1.83400 |
| CONDITIONS(13) | $n\_v_d$ | 37.16 |
| CONDITIONS(14) | $n\_P_{g,F} - (-0.001802 \times n\_v_d + 0.6483)$ | -0.0037 |
| CONDITIONS(15) | $fn\_3/fw$ | -0.62 |
| CONDITIONS(16) | $(\Phi\_p1 - \Phi\_n2)/D3$ | 0.266 |
| CONDITIONS(17) | $d_{SW}/f_t$ | 0.097 |

Figure 3:
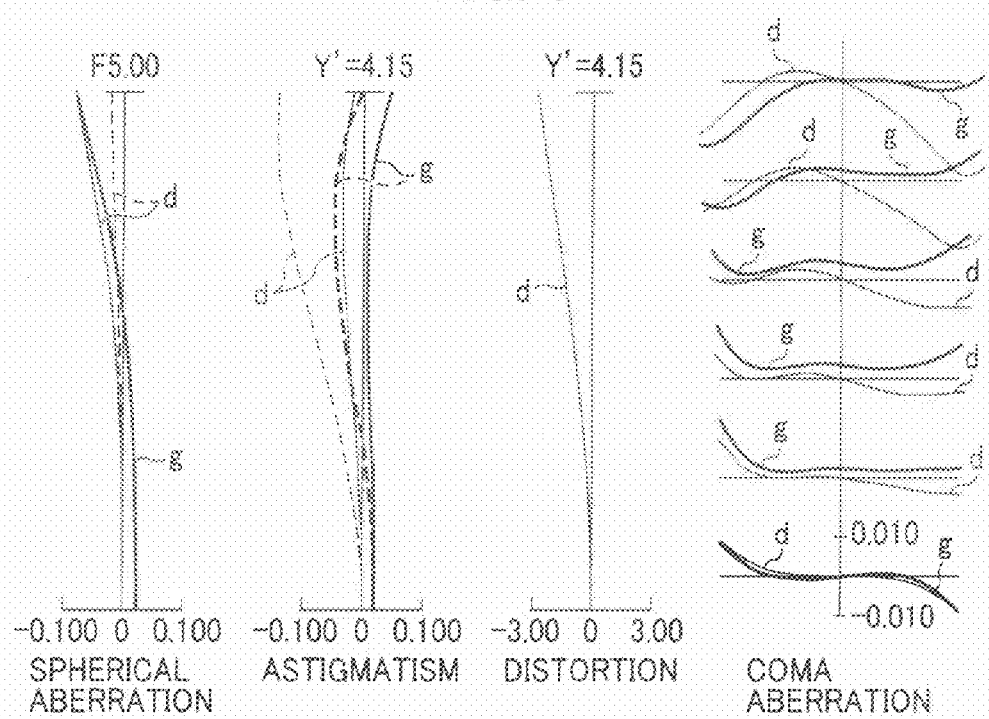
FIG. 3 is a view illustrating aberration curves of spherical aberration, astigmatism, distortion, and coma aberration in the zoom lens according to the example 1 at the intermediate focal position.
Figure 4:
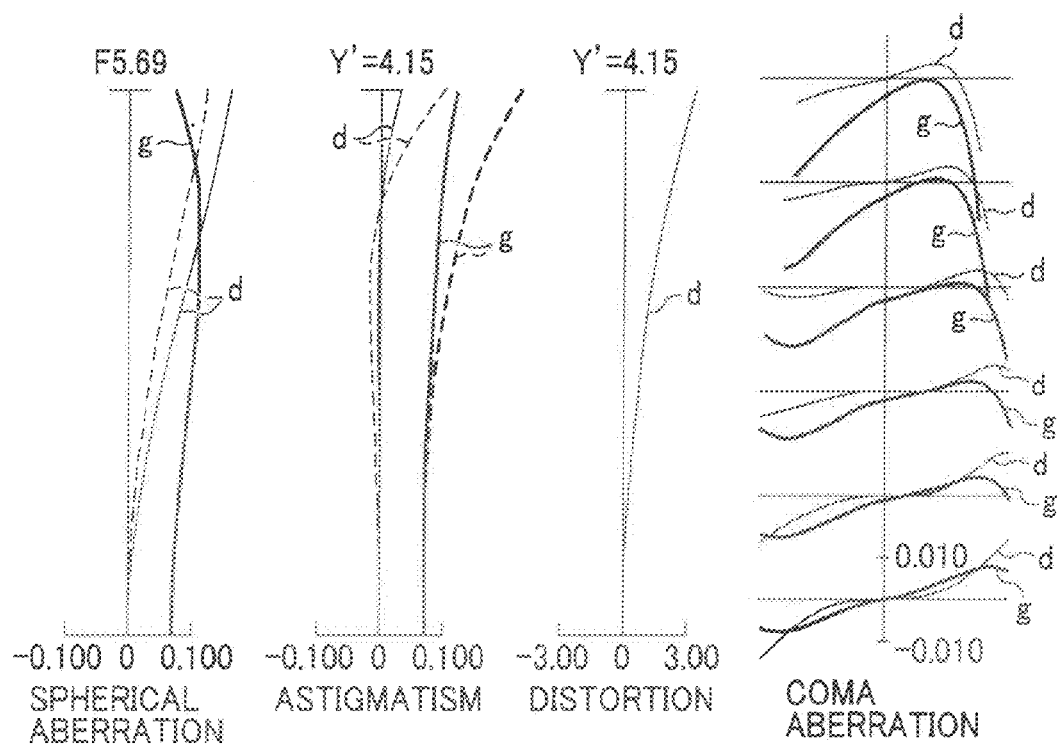
FIG. 4 is a view illustrating aberration curves of spherical aberration, astigmatism, distortion, and coma aberration in the zoom lens according to the example 1 at the long focal end.

FIGS. 2, 3 and 4 show aberration curves of spherical aberration, astigmatism, distortion, and coma aberration at the short focal (wide angle) end, the intermediate focal position, and the long focal (telephoto) end, respectively, in the zoom lens according to the Example 1.

In the spherical aberration curves in this example as well as the other examples, the broken line in the spherical aberration indicates a sine condition, and in astigmatism curves, the solid line indicates a sagittal image plane and the broken line indicates a meridional image plane. "g" and "d" in spherical aberration, astigmatism, distortion, and coma aberration curves indicate a d-line and a g-line.

Figure 5:
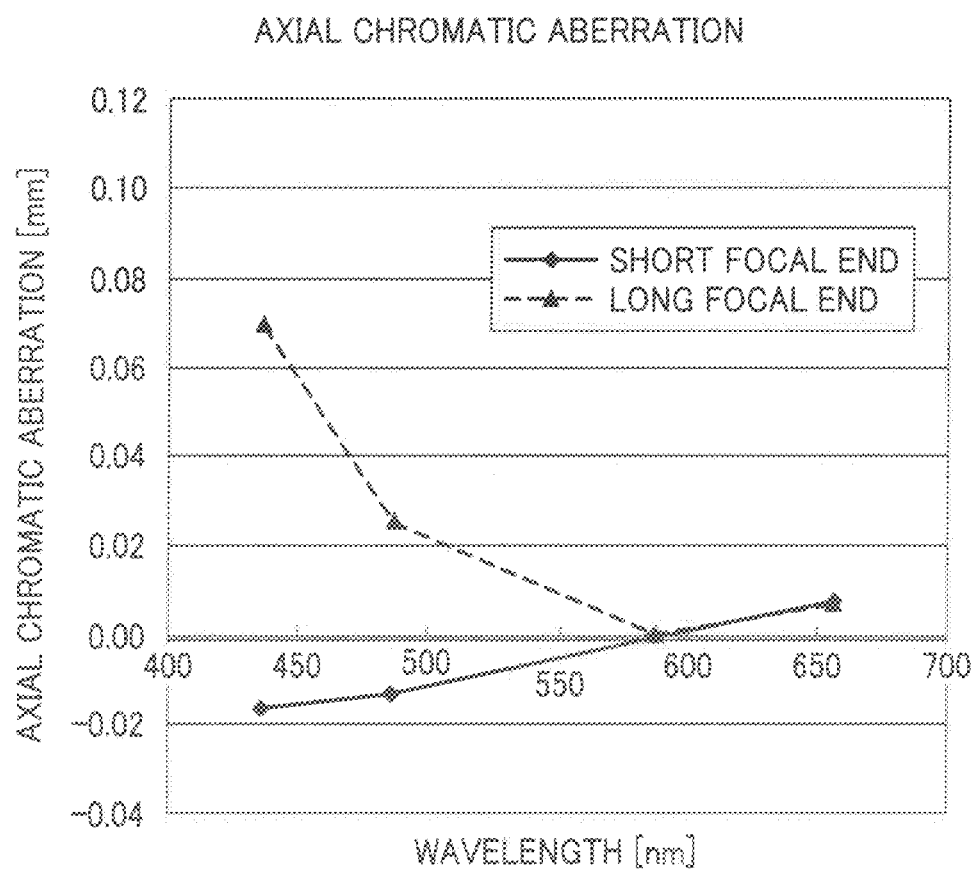
FIG. 5 is a view illustrating axial chromatic aberration characteristic curves in the zoom lens according to the example 1 at the short and long focal ends.
Figure 6:
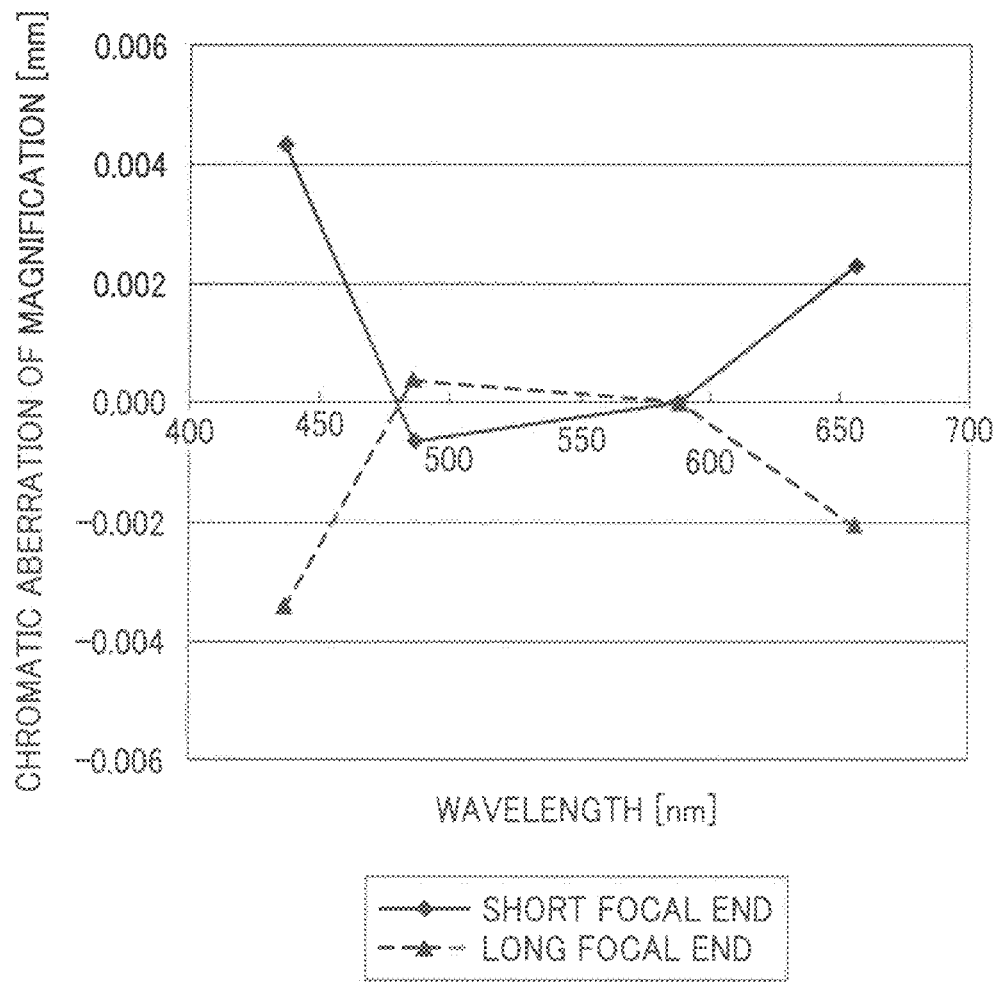
FIG. 6 is a view illustrating chromatic aberration characteristic curves of magnification in the zoom lens according to the example 1 at the short and long focal ends.

FIGS. 5 and 6 show characteristics of axial chromatic aberration and chromatic aberration of magnification at the short focal (wide angle) end and the long focal (telephoto) end, respectively, in the zoom lens according to Example 1, in a case of the image height of 0.7Y' for the d-line as a reference wavelength. In these drawings, a solid line indicates the short focal end and a broken line indicates the long focal end and.

(Example 2)

FIG. 7 shows schematic sectional views of an optical system of the zoom lens according to Example 2 of the first embodiment of the present invention along an optical axis (a) at the short focal length (wide angle or "Wide") end, (b) at a focal length position (Wide-Mean) intermediate between the short focal end and an intermediate focal position, (c) at the intermediate focal position (Mean), (d) at a focal length position (Mean-Tele) intermediate between the intermediate focal position and the long focal (telephoto, "Tele") end, and (e) at the long focal end.

In FIG. 7 showing the lens groups of Example 2, an object side (subject side) is indicated at a left side of the drawing, similarly to FIG. 1.

The zoom lens shown in FIG. 7, along the optical axis, includes a first lens group G1 having a positive refractive power, a second lens group G2 having a negative refractive power, a third lens group G3 having a positive refractive power, and a fourth lens group G4 having a positive refractive power, which are disposed in order from the object side, and an aperture stop AD disposed between the second lens group G2 and the third lens group G3. The first lens group G1 includes a first lens L11, a second lens L12 and a third lens L13, the second lens group G2 includes a first lens L21, a second lens L22, and a third lens L23, the third lens group G3 includes a first lens L31, a second lens L32, and a third lens L33, and the fourth lens group G4 includes a single lens L40.

Each of the first to fourth lens groups G1 to G4 is appropriately commonly supported by a common support frame or the like and when zooming, each lens group is integrally operated and the aperture stop AD is operated independently from each lens group. In FIG. 7, surface numbers of optical surfaces are shown. In addition, the same reference numbers are independently used in each Example for sake of simplicity and therefore the configuration indicated by the same reference number is not always the same configuration.

When changing the magnification of the zoom lens from the wide angle end (short focal end) to the telephoto end (long focal end), all of the first to fourth lens groups G1 to G4 are moved such that an interval between the first lens group G1 and the second lens group G2 is increased, an interval between the second lens group G2 and the third lens group G3 is decreased and an interval between the third lens group G3 and the fourth lens group G4 is increased. The first and third lens groups G1 and G3 are moved to be positioned at object side positions at the long focal end relative to positions at the short focal end.

The first lens group G1 has the first lens (a negative lens) L11 formed by a negative meniscus lens having a convex surface at an object side, the second lens (a first positive lens) L12 formed by a positive meniscus lens having a convex surface at an object side, and the third lens (a second positive lens) L13 formed by a positive meniscus lens having a convex surface at an object side, which are disposed in order from the object side.

The first lens L11 and the second lens L12 are closely stuck and cemented together with each other to form a cemented lens formed by the two lenses.

The second lens group G2 has the first lens (a first negative lens) L21 formed by an aspheric biconcave negative lens having a more largely concave surface at an image side, both surfaces being aspheric, the second lens (a second negative lens) L22 formed by a negative meniscus lens having a convex surface at an object side, and the third lens (a positive lens) L23 formed by a positive meniscus lens having a convex surface at an object side, which are disposed in order from the object side.

The aperture stop AD is disposed between the second and third lens groups G2 and G3.

The third lens group G3 has the first lens (a first positive lens) L31 formed by an aspheric biconvex positive lens having a more largely convex surface at an object side, both surfaces being aspheric, the second lens (a second positive lens) L32 formed by a biconvex positive lens having a more largely convex surface at an image side, and the third lens (a negative lens) L33 formed by a biconcave negative lens having a more largely concave surface at an image side, which are disposed in order from the object side. The second lens L32 and the third lens L33 are closely stuck and cemented together with each other to form a cemented lens formed by the two lenses.

The fourth lens group G4 has only the single positive lens L40 formed by a biconvex positive lens having a more largely convex surface at an object side, which is an aspheric lens having an aspheric surface at the object side.

As described above, the third lens group G3 is configured by the positive lens L31—the positive lens L32—the negative lens L33, which are disposed in order from the object side, so that a principal point of the third lens group G3 may be set at the object side and therefore magnification of the third lens group can be advantageously changed.

In the positive lens L31 at the most object side in the third lens group G3, height of light fluxes from the optical axis is most increased in the third lens group G3 so that there is a large advantage for the axial chromatic aberration. Off-axis light fluxes passing the positive lens L32 of the third lens group pass in different way from off-axis light fluxes passing the positive lens L31. Accordingly, the correction is shared by the positive lenses L31 and L32 so that the secondary spectrum of the chromatic aberration of magnification can be effectively reduced.

In Example 2, the focal length f of the entire optical system, the F number F, and the half field angle ω are changed within ranges of f=5.05 to 51.94, F=3.60 and 5.83, and ω=39.99 to 4.43, respectively. The optical properties of each optical element are as follows.

TABLE 5

| Surface No. | R | D | n | ν | Φ | GLASS | NOTE | |
|---|---|---|---|---|---|---|---|---|
| 1 | 35.483 | 0.80 | 2.00069 | 25.46 | 21.20 | TAFD40(HOYA) | L11 | G1 |
| 2 | 20.610 | 3.16 | 1.59282 | 68.63 | 19.80 | FCD505(HOYA) | L12 | |
| 3 | 349.846 | 0.20 | | | 19.60 | | | |
| 4 | 20.000 | 2.61 | 1.72916 | 54.68 | 18.40 | S-LAL18(OHARA) | L13 | |
| 5 | 79.510 | Variable DA | | | 18.00 | | | |
| 6* | −55.545 | 0.80 | 1.80610 | 40.88 | 11.40 | L-LAH53(OHARA) | L21 | G2 |
| 7* | 5.087 | 2.03 | | | 8.00 | | | |
| 8 | 200.000 | 0.80 | 1.81600 | 46.62 | 8.00 | S-LAH59(OHARA) | L22 | |
| 9 | 11.598 | 0.21 | | | 7.60 | | | |
| 10 | 8.315 | 1.57 | 1.92286 | 18.90 | 7.60 | S-NPH2(OHARA) | L23 | |
| 11 | 25.360 | Variable DB | | | 7.00 | | | |
| 12 | Aperture stop | Variable DC | | | 3.00 | | AD | |
| 13* | 6.408 | 2.71 | 1.55332 | 71.68 | 6.60 | MFCD500(HOYA) | L31 | G3 |
| 14* | −9.499 | 0.43 | | | 6.80 | | | |
| 15 | 11.888 | 3.06 | 1.60300 | 65.44 | 6.40 | S-PHM53(HOYA) | L32 | |
| 16 | −8.465 | 0.80 | 1.85026 | 32.27 | 5.60 | S-LAH71(OHARA) | L33 | |
| 17 | 5.198 | Variable DD | | | 5.20 | | | |
| 18* | 10.141 | 2.52 | 1.52528 | 56.20 | 9.60 | PLASTIC | L40 | G4 |
| 19 | −40.724 | Variable DE | | | 9.40 | | | |
| 20 | ∞ | 0.80 | 1.50000 | 64.00 | 8.80 | FILTER | FM | |
| 21 | ∞ | — | | | 8.80 | | | |

In Table 5, the lens surface indicated by adding "*" (asterisk) is aspheric surface. After a glass type name, a name of a manufacture is abbreviated to HOYA (HOYA CORPORATION), and OHARA (OHARA INC.).

That is, in Table 1, each of 6th, 7th, 13th, 14th, and 18th optical surfaces is aspheric and indicated by asterisk, and the parameters in the equation (18) for each aspheric surface are as follows.

TABLE 6

| | K | A4 | A6 | A8 | A10 |
|---|---|---|---|---|---|
| 6 | 0 | 4.71428E−04 | −1.17898E−05 | 1.35047E−07 | −4.39795E−10 |
| 7 | 0 | 3.61038E−04 | 4.30615E−06 | 6.17863E−07 | −5.30889E−08 |
| 13 | 0 | −7.43998E−04 | 3.07370E−05 | −3.12763E−06 | 1.08951E−07 |
| 14 | 0 | 3.26300E−04 | 4.41284E−05 | −3.94848E−06 | 1.40147E−07 |
| 18 | 0 | 9.62489E−06 | −8.26167E−07 | −3.04721E−09 | 6.15887E−10 |

In Example 2, the focal length f of the entire optical system, the F number F, the half field angle ω, a variable interval DA between the first lens group G1 and the second lens group G2, a variable interval DB between the second lens group G2 and the aperture stop AD, a variable interval DC between the aperture stop AD and the third lens group G3, a variable interval DD between the third lens group G3 and the fourth lens group G4, and a variable interval DE between the fourth lens group G4 and the filter are respectively changed as shown in the following table when zooming.

TABLE 7

VARIABLE INTERVALS

|  | SHORT FOCAL END (Wide) | SHORT-INTER-MEDIATE (W-M) | INTER-MEDIATE FOCAL POSITION (Mean) | INTER-MEDIATE-LONG (M-T) | LONG FOCAL END (Tele) |
|---|---|---|---|---|---|
| f | 5.05 | 9.00 | 15.99 | 29.27 | 51.94 |
| F NUMBER | 3.60 | 5.02 | 5.40 | 5.56 | 5.83 |
| ω | 39.93 | 25.32 | 14.56 | 8.03 | 4.43 |
| DA | 0.600 | 2.638 | 8.558 | 13.943 | 16.408 |
| DB | 8.217 | 5.445 | 2.825 | 0.800 | 0.800 |
| DC | 7.793 | 4.283 | 3.669 | 3.126 | 0.950 |
| DD | 3.500 | 5.753 | 5.431 | 5.661 | 11.434 |
| DE | 2.552 | 4.595 | 6.496 | 6.098 | 2.349 |

An opening diameter of the aperture stop AD at the long focal (Tele) end is φ3.8, and image height Y' is 4.15. Referring to FIG. 28, as described above, in order to correct the distortion by performing image processing, the imaging range at the long focal end (and the intermediate focal position) is almost matched with the imaging range of the light receiving device to be a rectangular imaging range. Then, Y'=3.80 at the short focal (wide) end to generate distortion so as to form a barreled shape imaging range at the short focal end. Then, image processing on the effective barreled shape imaging range at the short focal end is performed to form rectangular image information with the distortion reduced.

Accordingly, values corresponding to the conditions (1) to (17), which are shown as follows, satisfy the conditions (1) to (17).

TABLE 8

CONDITIONS

| CONDITIONS(1) | $p1\_n_d + p2\_n_d$ | 3.15632 |
| CONDITIONS(2) | $p1\_v_d$ | 71.68 |
| CONDITIONS(3) | $p2\_v_d$ | 65.44 |
| CONDITIONS(4) | $p1\_P_{g,F} - (-0.001802 \times p1\_v_d + 0.6483)$ | 0.0211 |
| CONDITIONS(5) | $p2\_P_{g,F} - (0.001802 \times p2\_v_d + 0.6483)$ | 0.0097 |
| CONDITIONS(6) | $p1\_n_d$ | 1.55332 |
| CONDITIONS(7) | $p2\_n_d$ | 1.60300 |
| CONDITIONS(8) | $p1\_v_d + p2\_v_d$ | 137.12 |
| CONDITIONS(9) | $(p1\_P_{g,F} + p2\_P_{g,F}) - (-0.001802 \times (p1\_v_d + p2\_v_d) + 0.6483)$ | 0.0308 |
| CONDITIONS(10) | f1_3/fw | 1.458 |
| CONDITIONS(11) | f1_3/f2_3 | 0.847 |
| CONDITIONS(12) | $n\_n_d$ | 1.85026 |
| CONDITIONS(13) | $n\_v_d$ | 32.27 |
| CONDITIONS(14) | $n\_P_{g,F} - (-0.001802 \times n\_v_d + 0.6483)$ | 0.0028 |
| CONDITIONS(15) | fn_3/fw | -0.73 |
| CONDITIONS(16) | $(\Phi\_p1 - \Phi\_n2)/D3$ | 0.200 |
| CONDITIONS(17) | $d_{SW}/f_t$ | 0.150 |

FIGS. 8, 9 and 10 show aberration curves of spherical aberration, astigmatism, distortion, and coma aberration at the short focal (wide angle) end, the intermediate focal position, and the long focal (telephoto) end, respectively, in the zoom lens according to the Example 2.

In the spherical aberration curves in this example as well as the other examples, the broken line in the spherical aberration indicates a sine condition, and in astigmatism curves, the solid line indicates a sagittal image plane and the broken line indicates a meridional image plane. "g" and "d" in spherical aberration, astigmatism, distortion, and coma aberration curves indicate a d-line and a g-line.

Figure 12:
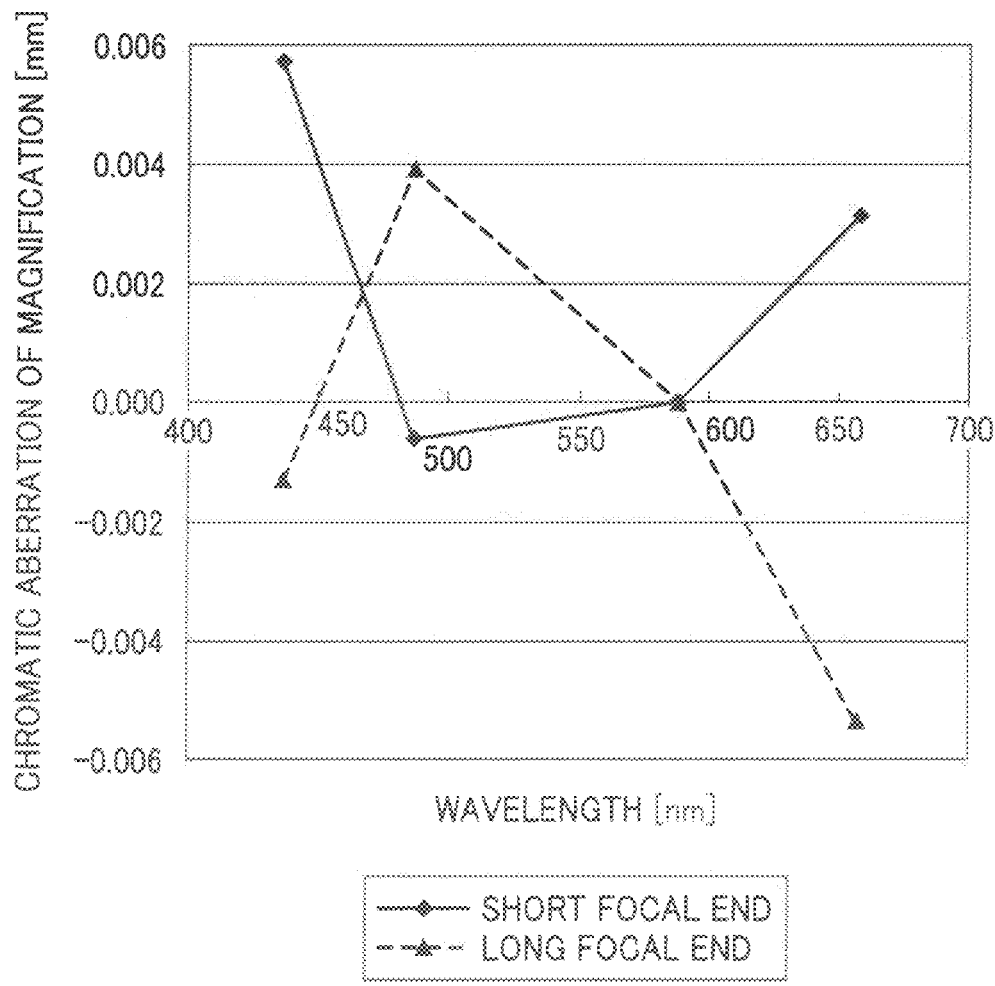
FIG. 12 is a view illustrating chromatic aberration characteristic curves of magnification in the zoom lens according to the example 2 at the short and long focal ends.

FIGS. 11 and 12 show characteristics of axial chromatic aberration and chromatic aberration of magnification at the short focal (wide angle) end and the long focal (telephoto) end, respectively, in the zoom lens according to Example 1, in a case of the image height of 0.7Y' for the d-line as a reference wavelength. In these drawings, a solid line indicates the short focal end and a broken line indicates the long focal end and.

(Example 3)

FIG. 13 shows schematic sectional views of an optical system of the zoom lens according to Example 3 of the first embodiment of the present invention along an optical axis (a) at the short focal length (wide angle or "Wide") end, (b) at a focal length position (Wide-Mean) intermediate between the short focal end and an intermediate focal position, (c) at the intermediate focal position (Mean), (d) at a focal length position (Mean-Tele) intermediate between the intermediate focal position and the long focal (telephoto, "Tele") end, and (e) at the long focal end.

In FIG. 13 showing the lens groups of Example 3, an object side (subject side) is indicated at a left side of the drawing, similarly to FIGS. 1 and 7.

The zoom lens shown in FIG. 13, along the optical axis, includes a first lens group G1 having a positive refractive power, a second lens group G2 having a negative refractive power, a third lens group G3 having a positive refractive power, and a fourth lens group G4 having a positive refractive power, which are disposed in order from the object side, and an aperture stop AD disposed between the second lens group G2 and the third lens group G3. The first lens group G1 includes a first lens L11, a second lens L12 and a third lens L13, the second lens group G2 includes a first lens L21, a second lens L22, and a third lens L23, the third lens group G3 includes a first lens L31, a second lens L32, and a third lens L33, and the fourth lens group G4 includes a single lens L40.

Each of the first to fourth lens groups G1 to G4 is appropriately commonly supported by a common support frame or the like and when zooming, each lens group is integrally operated and the aperture stop AD is operated independently from each lens group. In FIG. 13, surface numbers of optical surfaces are shown.

When changing the magnification of the zoom lens from the short focal end to the long focal end, all of the first to fourth lens groups G1 to G4 are moved such that an interval between the first lens group G1 and the second lens group G2 is increased, an interval between the second lens group G2 and the third lens group G3 is decreased and an interval between the third lens group G3 and the fourth lens group G4 is increased. The first and third lens groups G1 and G3 are moved to be positioned at object side positions at the long focal end relative to positions at the short focal end.

The first lens group G1 has the first lens (a negative lens) L11 formed by a negative meniscus lens having a convex surface at an object side, the second lens (a first positive lens) L12 formed by a biconvex positive lens having a more largely convex surface at an object side, and the third lens (a second positive lens) L13 formed by a positive meniscus lens having a convex surface at an object side, which are disposed in order from the object side. The first lens L11 and the second lens L12 are closely stuck and cemented together with each other to form a cemented lens formed by the two lenses.

The second lens group G2 has the first lens (a first negative lens) L21 formed by an aspheric biconcave negative lens having a more largely concave surface at an image side, both surfaces being aspheric, the second lens (a second negative lens) L22 formed by a biconcave negative lens having a more largely concave surface at an image side, and the third lens (a positive lens) L23 formed by a positive meniscus lens having a convex surface at an object side, which are disposed in order from the object side.

The aperture stop AD is disposed between the second and third lens groups G2 and G3.

The third lens group G3 has the first lens (a first positive lens) L31 formed by an aspheric biconvex positive lens having a more largely convex surface at an object side, both surfaces being aspheric, the second lens (a second positive lens) L32 formed by a biconvex positive lens having a more largely convex surface at an image side, and the third lens (a negative lens) L33 formed by a biconcave negative lens having a more largely concave surface at an image side, which are disposed in order from the object side. The second lens L32 and the third lens L33 are closely stuck and cemented together with each other to form a cemented lens formed by the two lenses.

The fourth lens group G4 has only the single positive lens L40 formed by a biconvex positive lens having a more largely convex surface at an object side, which is an aspheric lens having an aspheric surface at the object side.

As described above, the third lens group G3 is configured by the positive lens L31—the positive lens L32—the negative lens L33, which are disposed in order from the object side, so that a principal point of the third lens group G3 may be set at the object side and therefore magnification of the third lens group can be advantageously changed.

In the positive lens L31 at the most object side in the third lens group G3, height of light fluxes from the optical axis is most increased in the third lens group G3 so that there is a large advantage for the axial chromatic aberration. Off-axis light fluxes passing the positive lens L32 of the third lens group pass in different way from off-axis light fluxes passing the positive lens L31. Accordingly, the correction is shared by the positive lenses L31 and L32 so that the secondary spectrum of the chromatic aberration of magnification can be effectively reduced.

In Example 3, the focal length f of the entire optical system, the F number F, and the half field angle ω are changed within ranges of f=5.05 to 51.99, F=3.69 and 6.00, and ω=39.94 to 4.45, respectively. The optical properties of each optical element are as follows.

TABLE 9

| Surface No. | R | D | n | ν | Φ | GLASS | NOTE | |
|---|---|---|---|---|---|---|---|---|
| 1 | 40.259 | 0.80 | 2.00069 | 25.46 | 21.60 | TAFD40(HOYA) | L11 | G1 |
| 2 | 22.343 | 2.88 | 1.59282 | 68.63 | 20.40 | FCD505(HOYA) | L12 | |
| 3 | −2910.000 | 0.20 | | | 20.00 | | | |
| 4 | 19.966 | 2.63 | 1.72916 | 54.68 | 18.20 | S-LAL18(OHARA) | L13 | |
| 5 | 73.315 | Variable DA | | | 17.80 | | | |
| 6* | −101.039 | 0.80 | 1.80610 | 40.88 | 11.20 | L-LAH53(OHARA) | L21 | G2 |
| 7* | 5.242 | 2.17 | | | 7.80 | | | |
| 8 | −43.965 | 0.80 | 1.81600 | 46.62 | 7.60 | S-LAH59(OHARA) | L22 | |
| 9 | 14.154 | 0.20 | | | 7.40 | | | |
| 10 | 9.405 | 1.54 | 1.92286 | 18.90 | 7.40 | S-NPH2(OHARA) | L23 | |
| 11 | 40.454 | Variable DB | | | 6.80 | | | |
| 12 | Aperture stop | Variable DC | | | 3.00 | | AD | |
| 13* | 5.904 | 2.94 | 1.56907 | 71.30 | 6.80 | KGFK70(SUMITA) | L31 | G3 |
| 14* | −10.027 | 0.20 | | | 6.80 | | | |
| 15 | 9.551 | 2.29 | 1.60300 | 65.44 | 6.40 | S-PHM53(HOYA) | L32 | |
| 16 | −5.670 | 0.99 | 1.83400 | 37.16 | 5.80 | S-LAH60(OHARA) | L33 | |
| 17 | 4.905 | Variable DD | | | 5.20 | | | |
| 18* | 10.864 | 2.43 | 1.51633 | 64.06 | 9.20 | L-BSL7(OHARA) | L40 | G4 |
| 19 | −68.752 | Variable DE | | | 9.20 | | | |
| 20 | ∞ | 0.80 | 1.50000 | 64.00 | 8.60 | FILTER | FM | |
| 21 | ∞ | — | | | 8.60 | | | |

In Table 9, the lens surface indicated by adding "*" (asterisk) is aspheric surface. After a glass type name, a name of a manufacture is abbreviated to HOYA (HOYA CORPORATION), OHARA (OHARA INC.), and SUMITA (SUMITA OPTICAL GLASS INC.), as used in other Examples.

That is, in Table 9, each of 6th, 7th, 13th, 14th, and 18th optical surfaces is aspheric and indicated by asterisk, and the parameters in the equation (18) for each aspheric surface are as follows.

TABLE 10

ASPHERIC COEFFICIENTS

| | K | A4 | A6 | A8 | A10 |
|---|---|---|---|---|---|
| 6 | 0 | 3.60452E−04 | −8.78831E−06 | 1.30227E−07 | −9.58616E−10 |
| 7 | 0 | 3.30132E−04 | 1.55561E−05 | −2.89111E−07 | 2.42694E−08 |
| 13 | 0 | −6.68112E−04 | 2.83550E−05 | −2.79854E−06 | 1.15329E−07 |
| 14 | 0 | 3.16631E−04 | 4.47737E−05 | −3.93611E−06 | 1.68481E−07 |
| 18 | 0 | 2.35444E−05 | 2.12640E−06 | −5.87747E−08 | 9.28163E−10 |

In Example 3, the focal length f of the entire optical system, the F number F, the half field angle ω, a variable interval DA between the first lens group G1 and the second lens group G2, a variable interval DB between the second lens group G2 and the aperture stop AD, a variable interval DC between the aperture stop AD and the third lens group G3, a variable interval DD between the third lens group G3 and the fourth lens group G4, and a variable interval DE between the fourth lens group G4 and the filter are respectively changed as shown in the following table when zooming.

TABLE 11

VARIABLE INTERVALS

| | SHORT FOCAL END (Wide) | SHORT-INTER-MEDIATE (W-M) | INTER-MEDIATE FOCAL POSITION (Mean) | INTER-MEDIATE-LONG (M-T) | LONG FOCAL END (Tele) |
|---|---|---|---|---|---|
| f | 5.05 | 9.01 | 16.01 | 28.98 | 51.99 |
| F NUMBER | 3.69 | 4.84 | 5.58 | 5.54 | 6.00 |
| ω | 39.94 | 24.77 | 14.48 | 8.05 | 4.45 |
| DA | 0.600 | 4.284 | 8.662 | 14.282 | 16.597 |
| DB | 8.487 | 6.053 | 3.079 | 0.800 | 0.800 |
| DC | 7.401 | 4.364 | 3.546 | 3.387 | 0.950 |
| DD | 3.500 | 4.970 | 5.621 | 5.570 | 12.080 |
| DE | 2.830 | 4.366 | 6.519 | 6.025 | 2.334 |

An opening diameter of the aperture stop AD at the long focal (Tele) end is φ3.8, and image height Y' is 4.15. Referring to FIG. 28, as described above, in order to correct the distortion by performing image processing, the imaging range at the long focal end (and the intermediate focal position) is almost matched with the imaging range of the light receiving device to be a rectangular imaging range. Then, Y'=3.80 at the short focal (wide) end to generate distortion so as to form a barreled shape imaging range at the short focal end. Then, image processing on the effective barreled shape imaging range at the short focal end is performed to form rectangular image information with the distortion reduced.

Accordingly, values corresponding to the conditions (1) to (17), which are shown as follows, satisfy the conditions (1) to (17).

TABLE 12

CONDITIONS

| CONDITIONS(1) | $p1\_n_d + p2\_n_d$ | 3.17207 |
|---|---|---|
| CONDITIONS(2) | $p1\_v_d$ | 71.30 |
| CONDITIONS(3) | $p2\_v_d$ | 65.44 |
| CONDITIONS(4) | $p1\_P_{g,F} - (-0.001802 \times p1\_v_d + 0.6483)$ | 0.0252 |
| CONDITIONS(5) | $p2\_P_{g,F} - (-0.001802 \times p2\_v_d + 0.6483)$ | 0.0097 |
| CONDITIONS(6) | $p1\_n_d$ | 1.56907 |
| CONDITIONS(7) | $p2\_n_d$ | 1.60300 |

TABLE 12-continued

CONDITIONS

| CONDITIONS(8) | $p1\_v_d + p2\_v_d$ | 136.74 |
|---|---|---|
| CONDITIONS(9) | $(p1\_P_{g,F} + p2\_P_{g,F}) - (-0.001802 \times (p1\_v_d + p2\_v_d) + 0.6483)$ | 0.0349 |
| CONDITIONS(10) | f1_3/fw | 1.387 |
| CONDITIONS(11) | f1_3/f2_3 | 1.120 |
| CONDITIONS(12) | $n\_n_d$ | 1.83400 |
| CONDITIONS(13) | $n\_v_d$ | 37.16 |
| CONDITIONS(14) | $n\_P_{g,F} - (-0.001802 \times n\_v_d + 0.6483)$ | −0.0037 |
| CONDITIONS(15) | fn_3/fw | −0.60 |
| CONDITIONS(16) | $(\Phi\_p1 - \Phi\_n2)/D3$ | 0.249 |
| CONDITIONS(17) | $d_{SW}/f_\tau$ | 0.142 |

Figure 14:
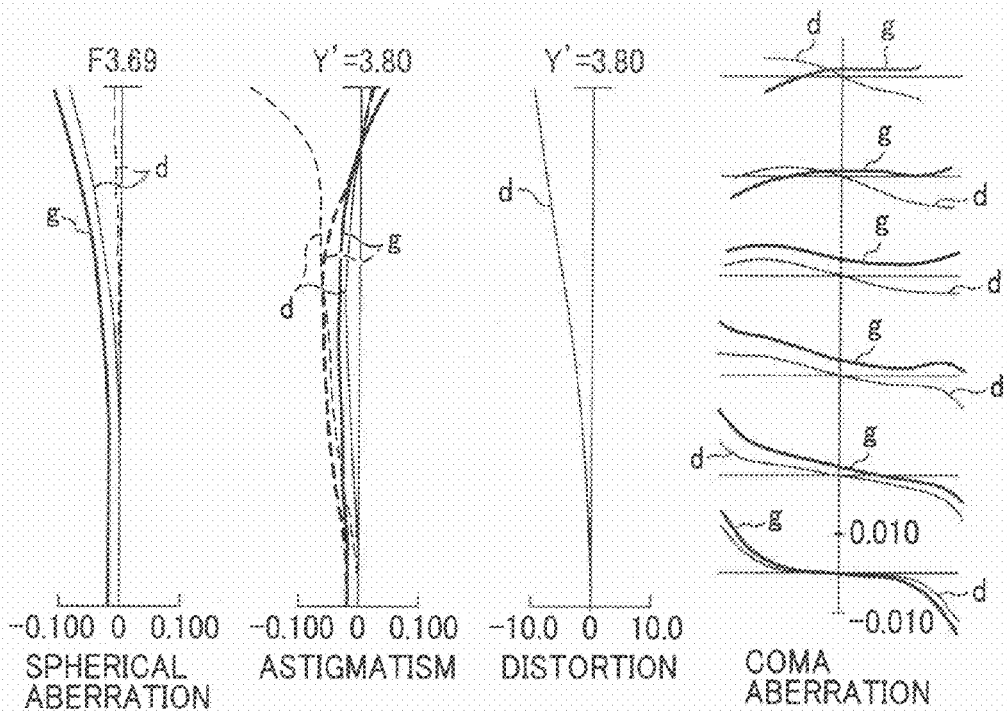
FIG. 14 is a view illustrating aberration curves of spherical aberration, astigmatism, distortion, and coma aberration in the zoom lens according to the example 3 at the short focal end.
Figure 15:
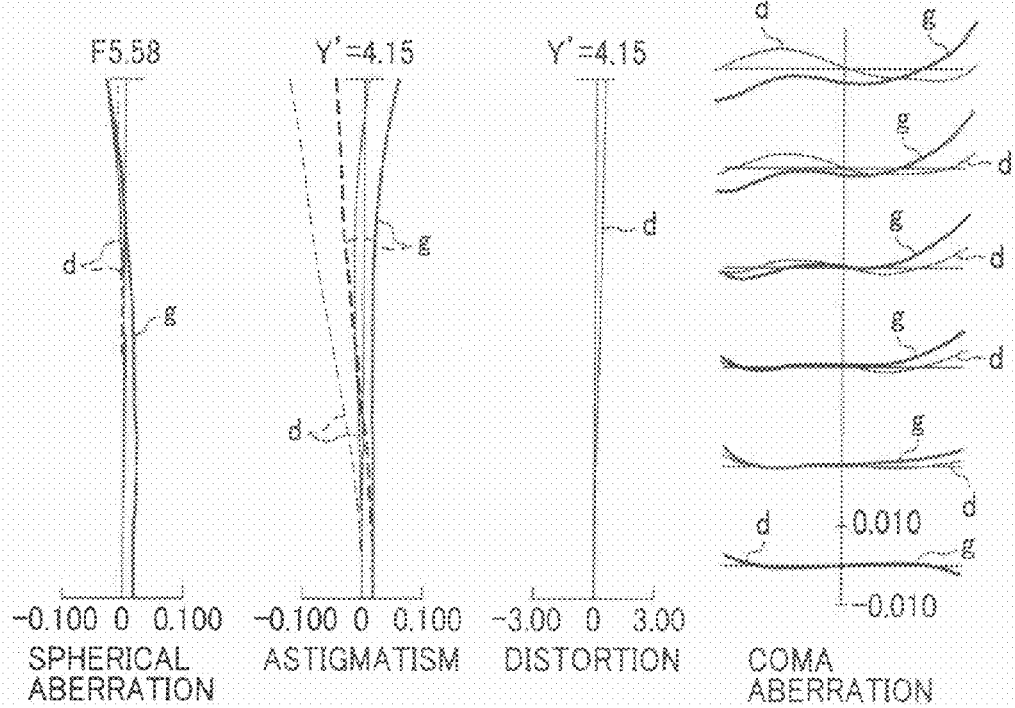
FIG. 15 is a view illustrating aberration curves of spherical aberration, astigmatism, distortion, and coma aberration in the zoom lens according to the example 3 at the intermediate focal position.
Figure 16:
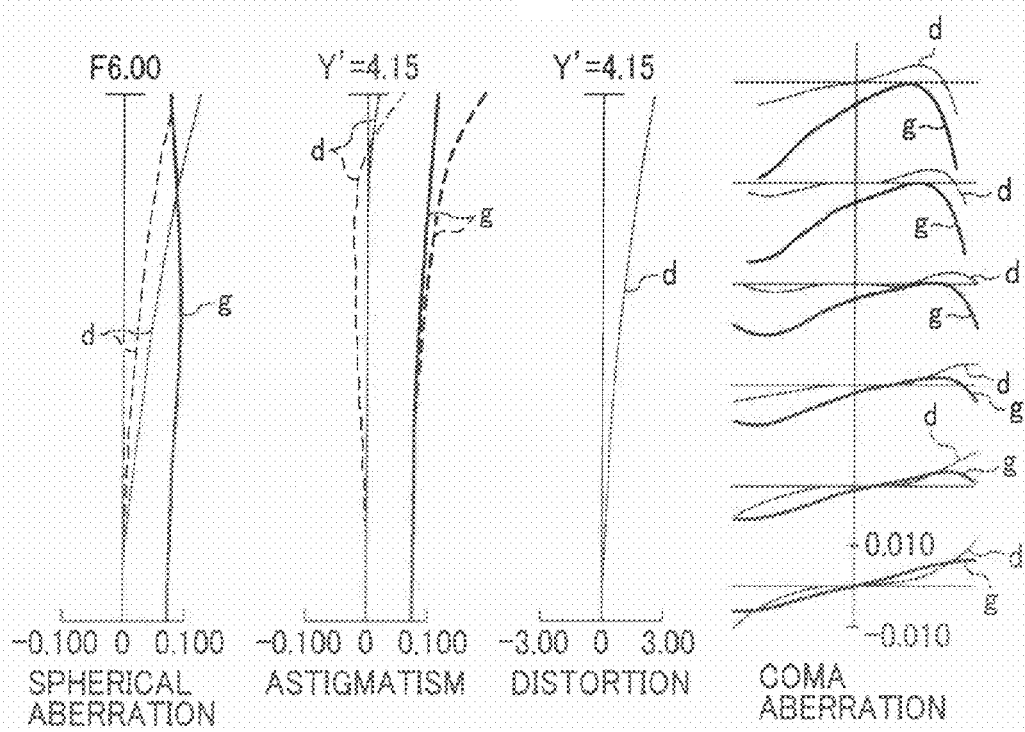
FIG. 16 is a view illustrating aberration curves of spherical aberration, astigmatism, distortion, and coma aberration in the zoom lens according to the example 3 at the long focal end.

FIGS. 14, 15 and 16 show aberration curves of spherical aberration, astigmatism, distortion, and coma aberration at the short focal (wide angle) end, the intermediate focal position, and the long focal (telephoto) end, respectively, in the zoom lens according to the Example 3.

In the spherical aberration curves in this example as well as the other examples, the broken line in the spherical aberration indicates a sine condition, and in astigmatism curves, the solid line indicates a sagittal image plane and the broken line indicates a meridional image plane. "g" and "d" in spherical aberration, astigmatism, distortion, and coma aberration curves indicate a d-line and a g-line.

Figure 17:
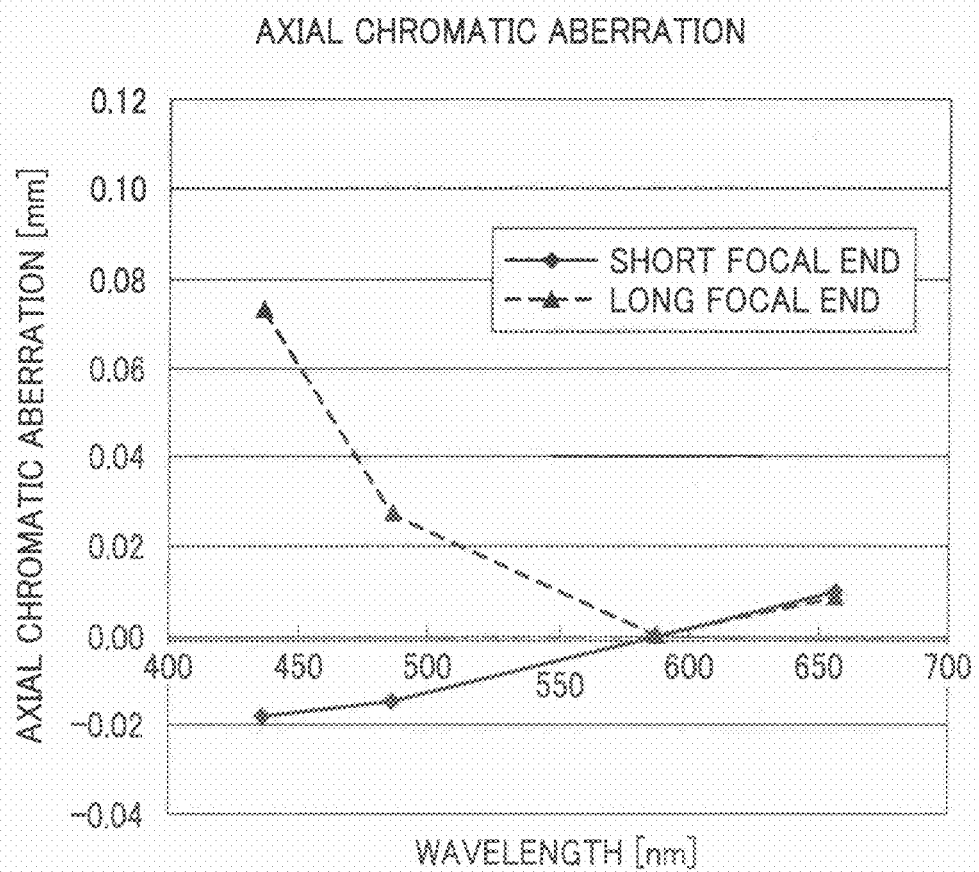
FIG. 17 is a view illustrating axial chromatic aberration characteristic curves in the zoom lens according to the example 3 at the short and long focal ends.
Figure 18:
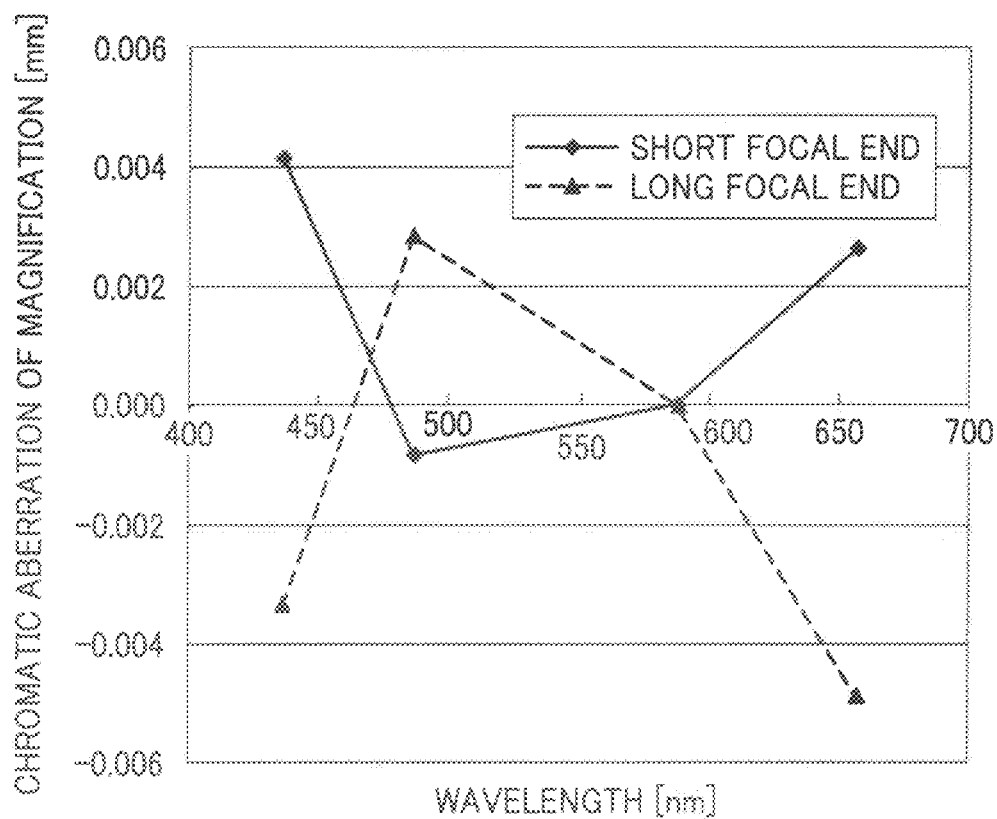
FIG. 18 is a view illustrating chromatic aberration characteristic curves of magnification in the zoom lens according to the example 3 at the short and long focal ends.

FIGS. 17 and 18 show characteristics of axial chromatic aberration and chromatic aberration of magnification at the short focal (wide angle) end and the long focal (telephoto) end, respectively, in the zoom lens according to Example 3, in a case of the image height of 0.7Y' for the d-line as a reference wavelength. In these drawings, a solid line indicates the short focal end and a broken line indicates the long focal end and. (Example 4)

FIG. 19 shows schematic sectional views of an optical system of the zoom lens according to Example 4 of the first embodiment of the present invention along an optical axis (a) at the short focal length (wide angle or "Wide") end, (b) at a focal length position (Wide-Mean) intermediate between the short focal end and an intermediate focal position, (c) at the intermediate focal position (Mean), (d) at a focal length position (Mean-Tele) intermediate between the intermediate focal position and the long focal (telephoto, "Tele") end, and (e) at the long focal end.

In FIG. 19 showing the lens groups of Example 4, an object side (subject side) is indicated at a left side of the drawing, similarly to FIGS. 1, 7 and 13.

The zoom lens shown in FIG. 19, along the optical axis, includes a first lens group G1 having a positive refractive power, a second lens group G2 having a negative refractive power, a third lens group G3 having a positive refractive power, and a fourth lens group G4 having a positive refractive power, which are disposed in order from the object side, and an aperture stop AD disposed between the second lens group G2 and the third lens group G3. The first lens group G1 includes a first lens L11, a second lens L12 and a third lens L13, the second lens group G2 includes a first lens L21, a second lens L22, and a third lens L23, the third lens group G3 includes a first lens L31, a second lens L32, and a third lens L33, and the fourth lens group G4 includes a single lens L40.

Each of the first to fourth lens groups G1 to G4 is appropriately commonly supported by a common support frame or the like and when zooming, each lens group is integrally operated and the aperture stop AD is operated independently from each lens group. In FIG. 19, surface numbers of optical surfaces are shown.

When changing the magnification of the zoom lens from the short focal end to the long focal end, all of the first to fourth lens groups G1 to G4 are moved such that an interval between the first lens group G1 and the second lens group G2 is increased, an interval between the second lens group G2 and the third lens group G3 is decreased and an interval between the third lens group G3 and the fourth lens group G4 is increased. The first and third lens groups G1 and G3 are moved to be positioned at object side positions at the long focal end relative to positions at the short focal end.

The first lens group G1 has the first lens (a negative lens) L11 formed by a negative meniscus lens having a convex surface at an object side, the second lens (a first positive lens) L12 formed by a positive meniscus lens having a convex surface at an object side, and the third lens (a second positive lens) L13 formed by a positive meniscus lens having a convex surface at an object side, which are disposed in order from the object side. The first lens L11 and the second lens L12 are closely stuck and cemented together with each other to form a cemented lens formed by the two lenses.

The second lens group G2 has the first lens (a first negative lens) L21 formed by an aspheric biconcave negative lens having a more largely concave surface at an image side, both surfaces being aspheric, the second lens (a second negative lens) L22 formed by a plano-concave negative lens having a concave surface at an image side, and the third lens (a positive lens) L23 formed by a positive meniscus lens having a convex surface at an object side, which are disposed in order from the object side.

The aperture stop AD is disposed between the second and third lens groups G2 and G3.

The third lens group G3 has the first lens (a first positive lens) L31 formed by an aspheric biconvex positive lens having a more largely convex surface at an object side, both surfaces being aspheric, the second lens (a second positive lens) L32 formed by a biconvex positive lens having a more largely convex surface at an image side, and the third lens (a negative lens) L33 formed by a biconcave negative lens having a more largely concave surface at an image side, which are disposed in order from the object side. The second lens L32 and the third lens L33 are closely stuck and cemented together with each other to form a cemented lens formed by the two lenses.

The fourth lens group G4 has only the single positive lens L40 formed by a biconvex positive lens having a more largely convex surface at an object side, which is an aspheric lens having an aspheric surface at the object side.

As described above, the third lens group G3 is configured by the positive lens L31—the positive lens L32—the negative lens L33, which are disposed in order from the object side, so that a principal point of the third lens group G3 may be set at the object side and therefore magnification of the third lens group can be advantageously changed.

In the positive lens L31 at the most object side in the third lens group G3, height of light fluxes from the optical axis is most increased in the third lens group G3 so that there is a large advantage for the axial chromatic aberration. Off-axis light fluxes passing the positive lens L32 of the third lens group pass in different way from off-axis light fluxes passing the positive lens L31. Accordingly, the correction is shared by the positive lenses L31 and L32 so that the secondary spectrum of the chromatic aberration of magnification can be effectively reduced.

In Example 4, the focal length f of the entire optical system, the F number F, and the half field angle ω are changed within ranges of f=5.05 to 51.92, F=3.53 and 5.50, and ω=39.89 to 4.54, respectively. The optical properties of each optical element are as follows.

TABLE 13

OPTICAL PROPERTIES

| Surface No. | R | D | n | ν | Φ | GLASS | NOTE | |
|---|---|---|---|---|---|---|---|---|
| 1 | 37.236 | 0.80 | 2.00069 | 25.46 | 21.20 | TAFD40(HOYA) | L11 | G1 |
| 2 | 21.559 | 3.45 | 1.59282 | 68.63 | 20.20 | FCD505(HOYA) | L12 | |
| 3 | 394.795 | 0.20 | | | 19.60 | | | |
| 4 | 20.204 | 2.56 | 1.72916 | 54.68 | 18.00 | S-LAL18(OHARA) | L13 | |
| 5 | 69.569 | Variable DA | | | 17.60 | | | |
| 6* | −86.185 | 0.80 | 1.80610 | 40.88 | 11.20 | L-LAH53(OHARA) | L21 | G2 |
| 7* | 5.127 | 2.02 | | | 7.80 | | | |
| 8 | ∞ | 0.80 | 1.81600 | 46.62 | 7.80 | S-LAH59(OHARA) | L22 | |
| 9 | 11.918 | 0.22 | | | 7.40 | | | |
| 10 | 8.296 | 1.54 | 1.92286 | 18.90 | 7.40 | S-NPH2(OHARA) | L23 | |
| 11 | 24.022 | Variable DB | | | 6.80 | | | |
| 12 | Aperture stop | Variable DC | | | 3.00 | | AD | |
| 13* | 6.149 | 2.79 | 1.55332 | 71.68 | 6.80 | MFCD500(HOYA) | L31 | G3 |
| 14* | −9.421 | 0.49 | | | 7.00 | | | |
| 15 | 10.325 | 2.49 | 1.59282 | 68.63 | 6.40 | FCD505(HOYA) | L32 | |
| 16 | −7.130 | 0.80 | 1.80100 | 34.97 | 5.80 | S-LAM66(OHARA) | L33 | |
| 17 | 4.771 | Variable DD | | | 5.20 | | | |

TABLE 13-continued

OPTICAL PROPERTIES

| Surface No. | R | D | n | ν | Φ | GLASS | NOTE | |
|---|---|---|---|---|---|---|---|---|
| 18* | 12.988 | 2.42 | 1.51633 | 64.06 | 9.20 | L-BSL7(OHARA) | L40 | G4 |
| 19 | −25.350 | Variable DE | | | 9.20 | | | |
| 20 | ∞ | 0.80 | 1.50000 | 64.00 | 8.60 | FILTER | FM | |
| 21 | ∞ | — | | | 8.60 | | | |

In Table 13, the lens surface indicated by adding "*" (asterisk) is aspheric surface. After a glass type name, a name of a manufacture is abbreviated to HOYA (HOYA CORPORATION), and OHARA (OHARA INC.).

That is, in Table 13, each of 6th, 7th, 13th, 14th, and 18th optical surfaces is aspheric and indicated by asterisk, and the parameters in the equation (18) for each aspheric surface are as follows.

TABLE 14

ASPHERIC COEFFICIENTS

| | K | A4 | A6 | A8 | A10 |
|---|---|---|---|---|---|
| 6 | 0 | 3.88073E−04 | −1.00776E−05 | 1.50096E−07 | −8.66650E−10 |
| 7 | 0 | 2.70821E−04 | 2.70817E−05 | −1.93822E−06 | 6.79745E−08 |
| 13 | 0 | −7.50023E−04 | 2.90956E−05 | −3.00276E−06 | 1.04056E−07 |
| 14 | 0 | 3.84884E−04 | 4.46964E−05 | −4.04645E−06 | 1.45436E−07 |
| 18 | 0 | 1.13662E−04 | 4.87570E−06 | −2.69570E−07 | 6.27513E−09 |

In Example 4, the focal length f of the entire optical system, the F number F, the half field angle ω, a variable interval DA between the first lens group G1 and the second lens group G2, a variable interval DB between the second lens group G2 and the aperture stop AD, a variable interval DC between the aperture stop AD and the third lens group G3, a variable interval DD between the third lens group G3 and the fourth lens group G4, and a variable interval DE between the fourth lens group G4 and the filter are respectively changed as shown in the following table when zooming.

TABLE 15

VARIABLE INTERVALS

| | SHORT FOCAL END (Wide) | SHORT-INTER-MEDIATE (W-M) | INTER-MEDIATE FOCAL POSITION (Mean) | INTER-MEDIATE-LONG (M-T) | LONG FOCAL END (Tele) |
|---|---|---|---|---|---|
| f | 5.05 | 9.00 | 16.00 | 29.00 | 51.92 |
| F NUMBER | 3.53 | 4.82 | 5.46 | 5.58 | 5.50 |
| ω | 39.89 | 24.86 | 14.63 | 8.23 | 4.54 |
| DA | 0.600 | 4.254 | 9.158 | 14.670 | 17.878 |
| DB | 7.766 | 5.992 | 3.081 | 0.800 | 0.800 |
| DC | 8.015 | 3.860 | 3.559 | 3.507 | 0.950 |
| DD | 3.500 | 4.249 | 5.893 | 6.711 | 10.292 |
| DE | 2.811 | 4.949 | 6.423 | 6.040 | 2.384 |

An opening diameter of the aperture stop AD at the long focal (Tele) end is φ3.8, and image height Y' is 4.15. Referring to FIG. 28, as described above, in order to correct the distortion by performing image processing, the imaging range at the long focal end (and the intermediate focal position) is almost matched with the imaging range of the light receiving device to be a rectangular imaging range. Then, Y'=3.80 at the short focal (wide) end to generate distortion so as to form a barreled shape imaging range at the short focal end. Then, image processing on the effective barreled shape imaging range at the short focal end is performed to form rectangular image information with the distortion reduced.

Accordingly, values corresponding to the conditions (1) to (17), which are shown as follows, satisfy the conditions (1) to (17).

TABLE 16

CONDITIONS

| CONDITIONS(1) | $p1\_n_d + p2\_n_d$ | 3.14614 |
|---|---|---|
| CONDITIONS(2) | $p1\_v_d$ | 71.68 |
| CONDITIONS(3) | $p2\_v_d$ | 68.63 |
| CONDITIONS(4) | $p1\_P_{g,F} - (-0.001802 \times p1\_v_d + 0.6483)$ | 0.0211 |
| CONDITIONS(5) | $p2\_P_{g,F} - (-0.001802 \times p2\_v_d + 0.6483)$ | 0.0195 |
| CONDITIONS(6) | $p1\_n_d$ | 1.55332 |
| CONDITIONS(7) | $p2\_n_d$ | 1.59282 |
| CONDITIONS(8) | $p1\_v_d + p2\_v_d$ | 140.31 |
| CONDITIONS(9) | $(p1\_P_{g,F} + p2\_P_{g,F}) - (-0.001802 \times (p1\_v_d + p2\_v_d) + 0.6483)$ | 0.0405 |
| CONDITIONS(10) | $f1\_3/fw$ | 1.422 |
| CONDITIONS(11) | $f1\_3/f2\_3$ | 0.956 |
| CONDITIONS(12) | $n\_n_d$ | 1.80100 |
| CONDITIONS(13) | $n\_v_d$ | 34.97 |
| CONDITIONS(14) | $n\_P_{g,F} - (-0.001802 \times n\_v_d + 0.6483)$ | 0.0011 |
| CONDITIONS(15) | $fn\_3/fw$ | −0.69 |
| CONDITIONS(16) | $(\Phi\_p1 - \Phi\_n2)/D3$ | 0.244 |
| CONDITIONS(17) | $d_{SW}/f_T$ | 0.154 |

Figure 22:
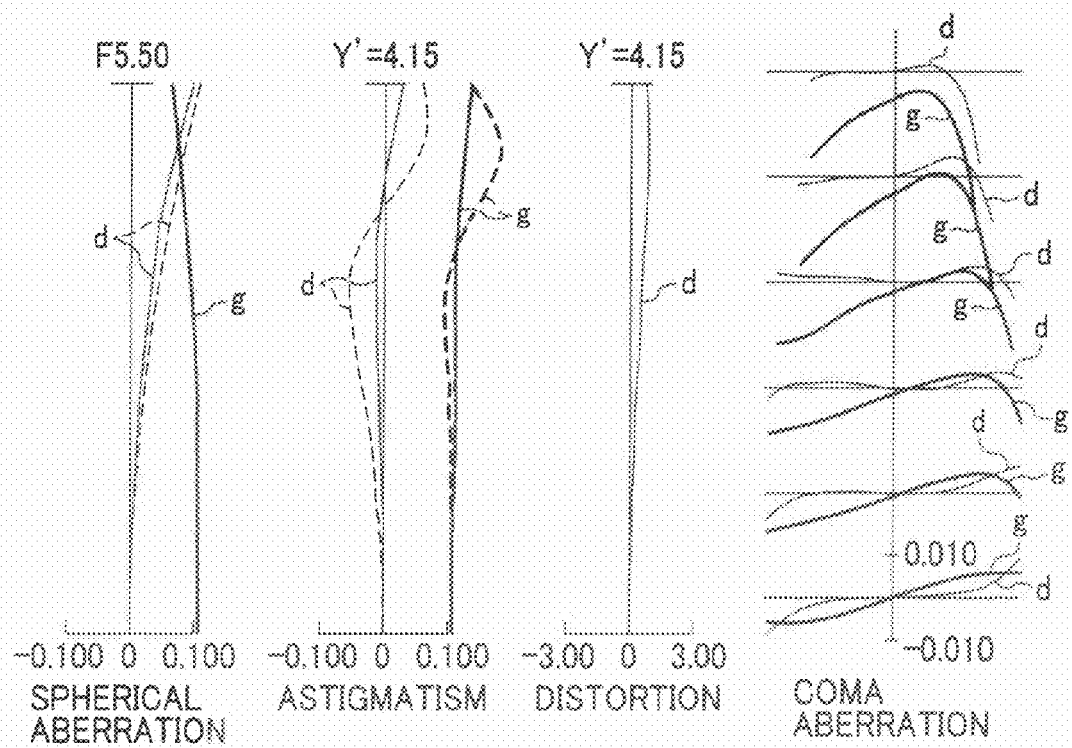
FIG. 22 is a view illustrating aberration curves of spherical aberration, astigmatism, distortion, and coma aberration in the zoom lens according to the example 4 at the long focal end.

FIGS. 20, 21 and 22 show aberration curves of spherical aberration, astigmatism, distortion, and coma aberration at the short focal (wide angle) end, the intermediate focal position, and the long focal (telephoto) end, respectively, in the zoom lens according to the Example 4. In the spherical aberration curves in this example as well as the other examples, the broken line in the spherical aberration indicates a sine condition, and in astigmatism curves, the solid line indicates a sagittal image plane and the broken line indicates a meridional image plane. "g" and "d" in spherical aberration, astigmatism, distortion, and coma aberration curves indicate a d-line and a g-line.

Figure 23:
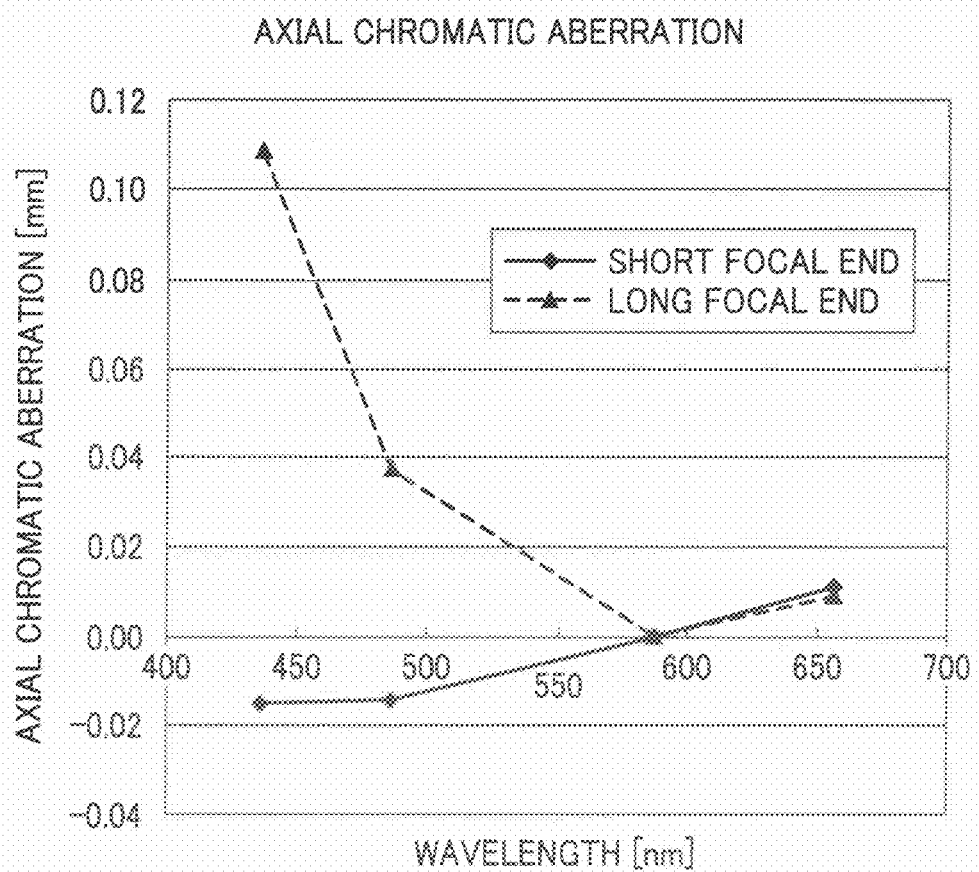
FIG. 23 is a view illustrating axial chromatic aberration characteristic curves in the zoom lens according to the example 4 at the short and long focal ends.
Figure 24:
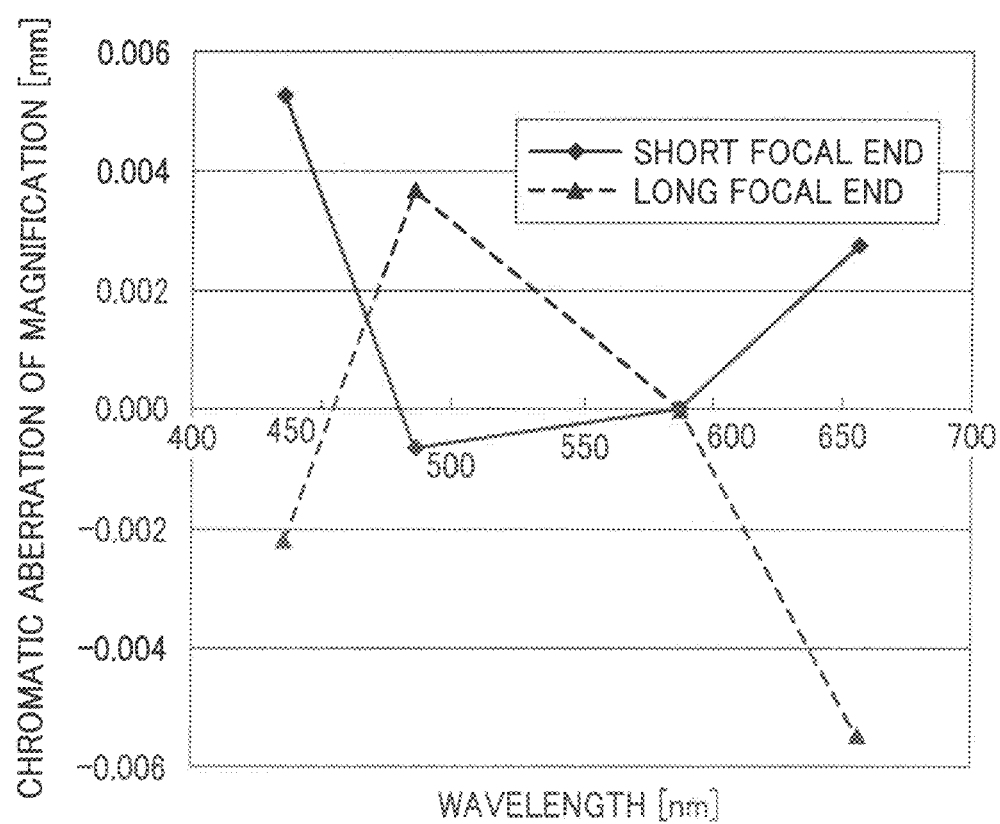
FIG. 24 is a view illustrating chromatic aberration characteristic curves of magnification in the zoom lens according to the example 1 at the short and long focal ends.

FIGS. 23 and 24 show characteristics of axial chromatic aberration and chromatic aberration of magnification at the short focal (wide angle) end and the long focal (telephoto) end, respectively, in the zoom lens according to Example 1, in a case of the image height of 0.7Y' for the d-line as a reference wavelength. In these drawings, a solid line indicates the short focal end and a broken line indicates the long focal end and.

As described above, according to an embodiment of the present invention, a zoom lens which has a sufficiently wide field angle, that is, half field angle of 38 degrees or more at the short focal end and a magnification ratio of 8 times or more can be provided. The zoom lens also achieves small size with about 10 lenses configuration and resolution corresponding to an image pickup device having 10 to 15 million pixels.

By using such a zoom lens, a small size, high image performance imaging apparatus or information device having a large magnification range sufficient for a normal photographic range can be achieved.

According to an embodiment of the present invention, it is possible to well correct the chromatic aberration to provide a high performance zoom lens. Therefore, color deviation peripheral parts of the image at the short focal end, color blur over the entire image at the long focal (telephoto) end can be further suppressed to achieve an improved image.

EFFECT OF INVENTION

According to an embodiment of the present invention, a zoom lens which has a sufficiently wide field angle, that is, half field angle of 38 degrees or more at the short focal end and a magnification ratio of 8 times or more can be provided. The zoom lens also achieves small size with about 10 lenses configuration and resolution corresponding to an image pickup device having 10 to 15 million pixels.

According to an embodiment of the present invention, the zoom lens includes a first lens group having a positive refractive power, a second lens group having a negative refractive power, a third lens group having a positive refractive power, and a fourth lens group having a positive refractive power, which are disposed in order from an object side to an image side, and an aperture stop disposed between the second and third lens groups. When changing the magnification of the zoom lens from a short focal end to a long focal end, an interval between the first and second lens groups increases, an interval between the second and third lens groups decreases, and an interval between the third and fourth lens groups increases, and the first and third lens groups are moved so as to be positioned at object side positions at the long focal end relative to positions at the short focal end. The third lens group has two positive lenses including a first positive lens L_p1 and a second positive lens L_p2 which are disposed in order from an object side. In a case where a partial dispersion ratio $P_{g,F}$ is defined by the following equation:

$$P_{g,F}=(n_g-n_F)/(n_F-n_C)$$

where $n_g$, $n_F$, and $n_C$ are refractive indices of a positive lens for g, F, and C lines, respectively, the following conditions are satisfied:

$$3.1<p1\_n_d+p2\_n_d<3.4 \tag{1}$$

$$60<p1\_v_d<80 \tag{2}$$

$$60<p2\_v_d<80 \tag{3}$$

$$0.008<p1\_P_{g,F}-(-0.001802\times p1\_v_d+0.6483)<0.050 \tag{4}$$

$$0.008<p2\_P_{g,F}-(-0.001802\times p2\_v_d+0.6483)<0.050 \tag{5},$$

where $p1\_n_d$ is a refractive index of the first positive lens L_p1, $p2\_n_d$ is a refractive index of the second positive lens L_p2, $p1\_v_d$ is an Abbe number of the first positive lens L_p1, $p2\_v_d$ is an Abbe number of the second positive lens L_p2, $p1\_P_{g,F}$ is a partial dispersion ratio of the first positive lens L_p1, and $p2\_P_{g,F}$ is a partial dispersion ratio of the second positive lens L_p2.

Therefore, a sufficiently wide field angle, that is, half field angle of 38 degrees or more at the short focal end and a magnification ratio of 8 times or more can be provided. The zoom lens also achieves small size with about 10 lenses configuration and resolution corresponding to an image pickup device having 10 to 15 million pixels.

According to an embodiment of the present invention, since the first positive lens is disposed at a most object side in the third lens group and the second positive lens is disposed next to the first positive lens, it is possible to further successfully correct the chromatic aberration to achieve further high performance.

According to an embodiment of the present invention, the following condition is satisfied:

$$1.0<f1\_3/fw<1.8 \tag{10}$$

where f1_3 is a focal length of the first positive lens disposed at the most object side in the third lens group, and fw is a focal length of the entire zoom lens at the short focal end. Therefore, it is possible to further successfully correct various aberrations to achieve further high performance.

According to an embodiment of the present invention, the following condition is satisfied:

$$0.5<f1\_3/f2\_3<1.5 \tag{11}$$

where f1_3 is a focal length of the first positive lens of the third lens group, and f2_3 is a focal length of the second positive lens of the third lens group. Therefore, it is possible to further successfully correct various aberrations to achieve further high performance.

According to an embodiment of the present invention, the third lens group includes a negative lens; and
the following conditions are satisfied:

$$1.60<n\_n_d<1.90 \tag{12}$$

$$28.0<n\_v_d<45.0 \tag{13}$$

$$-0.01<n\_P_{g,F}-(-0.001802\times n\_v_d+0.6483)<0.008 \tag{14}$$

where $n\_n_d$ is a refractive index of the negative lens of the third lens group, $n\_v_d$ is an Abbe number of the negative lens of the third lens group, and $n\_P_{g,F}$ is a partial dispersion ratio of the negative lens of the third lens group. Therefore, it is possible to further successfully correct the chromatic aberration to achieve further high performance.

According to an embodiment of the present invention, the third lens group includes a negative lens; and
the following condition is satisfied:

$$-1.0<fn\_3/fw<-0.4 \tag{15}$$

where fn_3 is a focal length of the negative lens of the third lens group, and fw is a focal length of the entire zoom lens at the short focal end. Therefore, it is possible to further successfully correct various aberrations to achieve further high performance.

According to an embodiment of the present invention, the third lens group includes a positive lens, a positive lens and a negative lens, which are disposed in order from an object side; and
the following condition is satisfied:

$$0.15<(\Phi\_p1-\Phi\_n2)/D3<0.3 \tag{16}$$

where $\Phi\_p1$ is a light flux effective diameter on an object side surface of the most object side positive lens in the third lens group, $\Phi\_n2$ is a light flux effective diameter on an image side surface of the negative lens of the third lens group, and D3 is a thickness of the third lens group on an optical axis. Therefore, it is possible to further successfully correct various aberrations to achieve further high performance and to stably manufacture such a zoom lens.

According to an embodiment of the present invention, since the first positive lens has an aspheric surface, it is possible to further successfully correct mainly spherical aberration to achieve small size and high performance.

According to an embodiment of the present invention, since an imaging apparatus includes the zoom lens according to the above-described embodiment as an photographic optical system, it is possible to achieve small size and high image quality.

According to an embodiment of the present invention, since an information apparatus having a photographing function, includes the zoom lens according to the above-described embodiment as an photographic optical system, it is possible to achieve small size and high image quality.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A zoom lens comprising:
    a first lens group having a positive refractive power, a second lens group having a negative refractive power, a third lens group having a positive refractive power, and a fourth lens group having a positive refractive power, which are disposed in order from an object side to an image side; and
    an aperture stop disposed between the second and third lens groups,
    wherein when changing magnification of the zoom lens from a short focal end to a long focal end, an interval between the first and second lens groups increases, an interval between the second and third lens groups decreases, and an interval between the third and fourth lens groups increases;
    the first and third lens groups are moved so as to be positioned at object side positions at the long focal end relative to positions at the short focal end;
    the third lens group has two positive lenses including a first positive lens L_p1 and a second positive lens L_p2 which are disposed in order from an object side; and
    in a case where a partial dispersion ratio $P_{g,F}$ is defined by the following equation:

$$P_{g,F}=(n_g-n_F)/(n_F-n_C)$$

where $n_g$, $n_F$, and $n_C$ are refractive indices of a positive lens for g, F, and C lines, respectively, the following conditions are satisfied:

$$3.1<p1\_n_d+p2\_n_d<3.4 \quad (1)$$

$$60<p1\_v_d<80 \quad (2)$$

$$60<p2\_v_d<80 \quad (3)$$

$$0.008<p1\_P_{g,F}-(-0.001802\times p1\_v_d+0.6483)<0.050 \quad (4)$$

$$0.008<p2\_P_{g,F}-(-0.001802\times p2\_v_d+0.6483)<0.050 \quad (5),$$

where $p1\_n_d$ is a refractive index of the first positive lens L_p1, $p2\_n_d$ is a refractive index of the second positive lens L_p2, $p1\_v_d$ is an Abbe number of the first positive lens L_p1, $p2\_v_d$ is an Abbe number of the second positive lens L_p2, $p1\_P_{g,F}$ is a partial dispersion ratio of the first positive lens L_p1, and $p2\_P_{g,F}$ is a partial dispersion ratio of the second positive lens L_p2.

2. The zoom lens according to claim 1, wherein the first positive lens is disposed at a most object side in the third lens group and the second positive lens is disposed next to the first positive lens.

3. The zoom lens according to claim 2, wherein the following condition is satisfied:

$$1.0<f1\_3/fw<1.8 \quad (10)$$

where f1_3 is a focal length of the first positive lens disposed at the most object side in the third lens group, and fw is a focal length of the entire zoom lens at the short focal end.

4. The zoom lens according to claim 1, wherein the following condition is satisfied:

$$0.5<f1\_3/f2\_3<1.5 \quad (11)$$

where f1_3 is a focal length of the first positive lens of the third lens group, and f2_3 is a focal length of the second positive lens of the third lens group.

5. The zoom lens according to claim 1,
    wherein the third lens group includes a negative lens; and
    the following conditions are satisfied:

$$1.60<n\_n_d<1.90 \quad (12)$$

$$28.0<n\_v_d<45.0 \quad (13)$$

$$-0.01<n\_P_{g,F}-(-0.001802\times n\_v_d+0.6483)<0.008 \quad (14)$$

where $n\_n_d$ is a refractive index of the negative lens of the third lens group, $n\_v_d$ is an Abbe number of the negative lens of the third lens group, and $n\_P_{g,F}$ is a partial dispersion ratio of the negative lens of the third lens group.

6. The zoom lens according to claim 1, wherein
    the third lens group includes a negative lens; and
    the following condition is satisfied:

$$-1.0<fn\_3/fw<-0.4 \quad (15)$$

where fn_3 is a focal length of the negative lens of the third lens group, and fw is a focal length of the entire zoom lens at the short focal end.

7. The zoom lens according to claim 1, wherein the third lens group includes a positive lens, a positive lens and a negative lens, which are disposed in order from an object side; and
    the following condition is satisfied:

$$0.15<(\Phi\_p1-\Phi\_n2)/D3<0.3 \quad (16)$$

where $\Phi\_p1$ is a light flux effective diameter on an object side surface of the most object side positive lens in the third lens group, $\Phi\_n2$ is a light flux effective diameter on an image side surface of the negative lens of the third lens group, and D3 is a thickness of the third lens group on an optical axis.

8. The zoom lens according to claim 1, wherein the first positive lens has an aspheric surface.

9. An imaging apparatus comprising the zoom lens according to claim 1 as a photographic optical system.

10. An information apparatus having a photographing function, comprising the zoom lens according to claim 1 as a photographic optical system.

* * * * *